US011841836B2

(12) United States Patent
Jakubovitz et al.

(10) Patent No.: US 11,841,836 B2
(45) Date of Patent: Dec. 12, 2023

(54) TARGET ENVIRONMENT DATA SEEDING

(71) Applicant: OWNBACKUP LTD., Tel Aviv (IL)

(72) Inventors: Bar Jakubovitz, Herzliya (IL); Shai Rubin, Binyamina (IL); Yehonatan Mazar, Tel Aviv (IL); David Anaton, Holon (IL); Shahar Yalov, Tel Aviv (IL); Roy Emek, Tel Aviv (IL)

(73) Assignee: OWNBACKUP LTD., Tel Aviv (IL)

( * ) Notice: Subject to any disclaimer, the term of this patent is extended or adjusted under 35 U.S.C. 154(b) by 106 days.

(21) Appl. No.: 17/565,516

(22) Filed: Dec. 30, 2021

(65) Prior Publication Data

US 2022/0215004 A1 Jul. 7, 2022

Related U.S. Application Data

(60) Provisional application No. 63/133,451, filed on Jan. 4, 2021.

(51) Int. Cl.
*G06F 16/21* (2019.01)
*G06F 16/25* (2019.01)
(Continued)

(52) U.S. Cl.
CPC .......... *G06F 16/21* (2019.01); *G06F 11/3664* (2013.01); *G06F 16/2282* (2019.01); *G06F 16/252* (2019.01)

(58) Field of Classification Search
CPC ...................................................... G06F 16/21
(Continued)

(56) References Cited

U.S. PATENT DOCUMENTS 3,838,512 A 10/1974 Sanderson et al.
7,107,182 B2 9/2006 Fujikawa et al.
(Continued)

FOREIGN PATENT DOCUMENTS

EP 2251802 A1 11/2010
WO 2013115786 A1 8/2013

OTHER PUBLICATIONS

International Application # PCT/IB2021/062467 Search Report dated Apr. 27, 2022.
(Continued)

*Primary Examiner* — Muluemebet Gurmu
(74) *Attorney, Agent, or Firm* — KLIGLER & ASSOCIATES PATENT ATTORNEYS LTD

(57) ABSTRACT

A method, including accessing a source database including records stored in tables, which are organized in a hierarchy defining respective parents and dependents of the tables, containing respective parent and dependent records, the records including attribute values. Upon presenting a first list of the tables, an input is received selecting a first table. Upon presenting a second list of the tables related to the first table, an input is received selecting a second table in the second list. Upon presenting filtering criteria for the selected tables, a filtering request is received for a given selected table. The request is applied to the given selected table to select a subset of the records in the given selected table and to generate a target database including the subset of the records and the records in the set that are the respective directly related records of the records in the subset.

23 Claims, 8 Drawing Sheets

(51) Int. Cl.
*G06F 11/36* (2006.01)
*G06F 16/22* (2019.01)

(58) Field of Classification Search
USPC .......................................................... 707/609
See application file for complete search history.

(56) References Cited

U.S. PATENT DOCUMENTS

| | | | |
|---|---|---|---|
| 7,461,077 B1* | 12/2008 | Greenwood | G06F 3/0482 707/999.102 |
| 7,865,874 B2 | 1/2011 | Wookey | |
| 8,539,282 B1 | 9/2013 | Kabanov et al. | |
| 8,649,995 B2 | 2/2014 | Thulasidasan et al. | |
| 9,244,818 B1 | 1/2016 | Paleja | |
| 9,514,164 B1* | 12/2016 | Matic | G06F 16/2365 |
| 9,529,700 B2 | 12/2016 | Raghavan et al. | |
| 9,582,408 B1 | 2/2017 | Jayaraman et al. | |
| 9,721,116 B2 | 8/2017 | Driesen et al. | |
| 9,734,043 B2 | 8/2017 | Crova et al. | |
| 9,787,779 B2 | 10/2017 | Frank et al. | |
| 10,013,333 B2 | 7/2018 | Wood et al. | |
| 10,013,339 B2 | 7/2018 | Athinathan | |
| 10,042,636 B1 | 8/2018 | Srivastava et al. | |
| 10,042,742 B2 | 8/2018 | Jerrard-Dunne et al. | |
| 10,127,144 B2 | 11/2018 | Johnston et al. | |
| 10,223,658 B2 | 3/2019 | Cornilescu | |
| 10,255,152 B2 | 4/2019 | Wei | |
| 10,282,280 B1 | 5/2019 | Gouskova et al. | |
| 10,613,971 B1 | 4/2020 | Vasikarla | |
| 10,956,301 B2 | 3/2021 | Emek et al. | |
| 11,188,451 B2 | 11/2021 | Rubin | |
| 11,269,757 B2 | 3/2022 | Emek et al. | |
| 2002/0101920 A1 | 8/2002 | Choi et al. | |
| 2005/0198074 A1* | 9/2005 | Khayter | G06F 16/27 |
| 2009/0319832 A1 | 12/2009 | Zhang et al. | |
| 2010/0169859 A1 | 7/2010 | Bergman et al. | |
| 2010/0318481 A1 | 12/2010 | Feynman | |
| 2013/0139003 A1 | 5/2013 | Patwardhan et al. | |
| 2014/0007056 A1 | 1/2014 | Eizerovich | |
| 2014/0143525 A1 | 5/2014 | Taylor, III et al. | |
| 2014/0310690 A1 | 10/2014 | Yang | |
| 2015/0014306 A1 | 1/2015 | Tages | |
| 2016/0246706 A1 | 8/2016 | Sathyamurthy et al. | |
| 2016/0246838 A1 | 8/2016 | Li et al. | |
| 2016/0314062 A1 | 10/2016 | Castro | |
| 2017/0124487 A1 | 5/2017 | Szeto et al. | |
| 2017/0168885 A1 | 6/2017 | Jain et al. | |
| 2017/0169370 A1 | 6/2017 | Cornilescu | |
| 2017/0269921 A1 | 9/2017 | Vicente et al. | |
| 2017/0286267 A1 | 10/2017 | Jain et al. | |
| 2018/0024914 A1 | 1/2018 | Yi | |
| 2018/0060210 A1 | 3/2018 | Pandey et al. | |
| 2018/0157485 A1 | 6/2018 | Kugler | |
| 2018/0173780 A1* | 6/2018 | Rosier | G06F 16/2246 |
| 2018/0210821 A1 | 7/2018 | Raghavan et al. | |
| 2018/0260312 A1 | 9/2018 | Strachan et al. | |
| 2018/0357154 A1 | 12/2018 | Dolby et al. | |
| 2018/0365133 A1 | 12/2018 | Mitchell et al. | |
| 2019/0370010 A1 | 12/2019 | Iley et al. | |
| 2020/0104246 A1 | 4/2020 | Bhatt | |
| 2020/0151319 A1 | 5/2020 | Sharma et al. | |
| 2022/0318241 A1* | 10/2022 | Potter | G06F 16/22 |

OTHER PUBLICATIONS

U.S. Appl. No. 17/509,002 Office Action dated Nov. 7, 2022.
Commvault Systems. Inc., "Seeding a Salesforce Sandbox", pp. 1-3, Oct. 16, 2019.
Ownback Up, "Salesforce® Replication and Sandbox Seeding", fact sheet, p. 1, Oct. 5, 2017.
Salesforce Inc., "Development Lifecycle Guide—Enterprise Development on the Force.com Platform", Version 38.0, Winter '17, pp. 1-77, Oct. 11, 2016.
Salesforce "Your complete CRM handbook", pp. 1-16, Dec. 1, 2020.
Microsoft Corporation, "SQL Service 2019 Licensing Datasheet", pp. 1-4, Oct. 30, 2019.

* cited by examiner

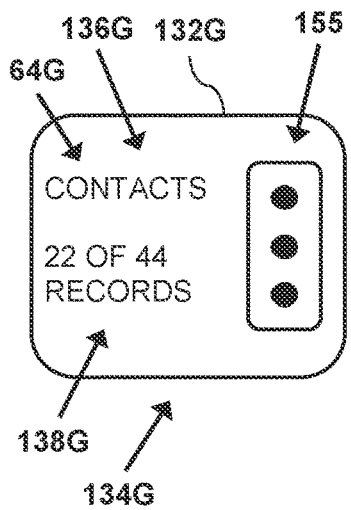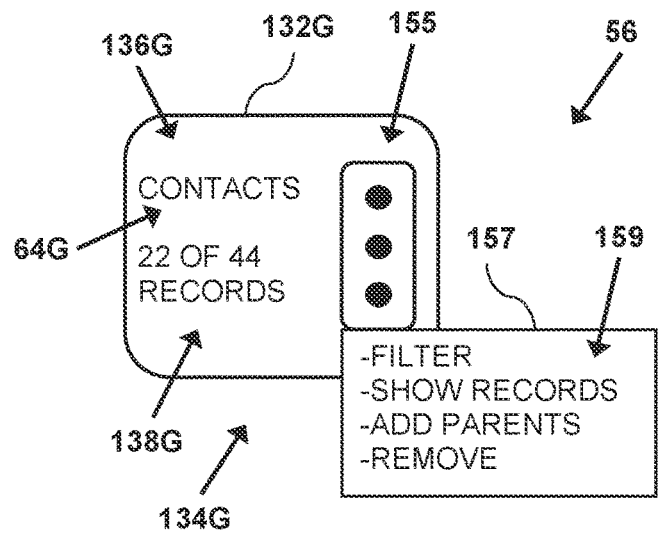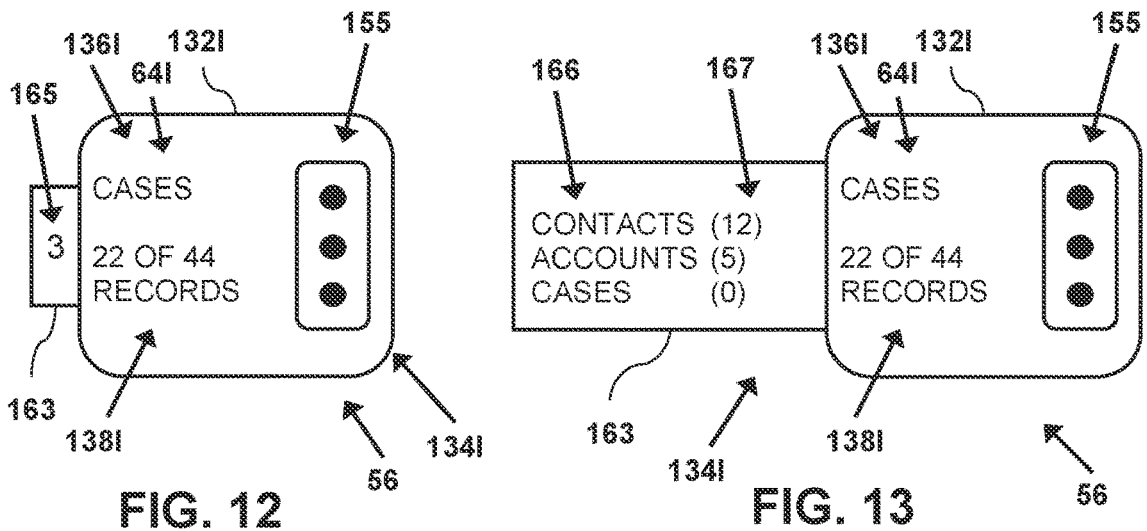

TARGET ENVIRONMENT DATA SEEDING

CROSS-REFERENCE TO RELATED APPLICATIONS

This application claims the benefit of U.S. Provisional Patent Application 63/133,451, filed Jan. 4, 2021, which is incorporated herein by reference.

FIELD OF THE INVENTION

The present invention relates generally to software testing and deployment, and particularly to generating a target dataset that is representative of an existing source dataset.

BACKGROUND OF THE INVENTION

Software applications are typically updated on a continual basis to optimize performance, to add new features and to fix bugs. Before deploying an updated application to a production environment that can access (and possibly modify) production data, the updated application can be tested with test data in a separate test environment. Upon completing testing, the updated application can be migrated to the production environment. Environments such as test and production environments typically comprise a data source such as a database comprising a relational system that stores data. In some instances, each of the environments may be sandboxed.

In some instances, test data may comprise cloned production data. Cloned production data can be generated by copying all the production data to the test environment. While cloning production data can be a relatively simple operation, it can be expensive (i.e., in terms of hardware, license and support costs), time-consuming, not agile (i.e., the data cannot be refreshed) and laborious.

In additional instances, test data may comprise synthetic test data. While synthetic test data can be useful if production data does not exist or if privacy requirements limit data availability or how it can be used, generating synthetic data can be resource-intensive, tedious, and time-consuming.

In further instances, test data may comprise a subset of production data. While subsetting production data it typically less expensive than generating cloned production data or synthetic test data, it can be skill-intensive due to any referential integrity and/or sensitive data issues in the production data.

The description above is presented as a general overview of related art in this field and should not be construed as an admission that any of the information it contains constitutes prior art against the present patent application.

SUMMARY OF THE INVENTION

There is provided, in an embodiment of the present invention, a method for generating target data for a software application, including accessing, by a data seeding system, a source database including source records stored in multiple tables, which are organized in a hierarchy defining respective parent tables and dependent tables of the tables in the source database, containing respective parent source records and dependent source records of the source records in the tables, each source record in the tables including one or more attribute values, presenting, on a display, a first list of the tables, receiving, from a user, a first input selecting a first table in the first list, presenting, on the display, a second list of the tables in the source database that are related to the first table by being parent tables or dependent tables of the first table, receiving, from the user, a second input selecting at least one second table in the second list, presenting, on the display, filtering criteria for the attribute values in one or more of the tables in a set including the first table and the at least one second table, receiving, from the user, a filtering request for application to the attribute values in one of the tables selected from among the first table and the at least one second table and applying the filtering request to the attribute values in the one of the tables so as to select a subset of the source records in the one of the tables and to generate a target database including the selected subset of the source records and the source records in the set of the tables that are the respective parent source records or dependent source records of the source records in the selected subset.

In one embodiment, a given table includes a customer relationship management data file.

In another embodiment, the method further includes presenting, on the display, an additional list of one or more source environments, and receiving, from the user an additional input selecting a given source environment in the additional list, and wherein accessing the source database includes accessing the source database on the selected source environment.

In an additional embodiment, the method further includes presenting, on the display, an additional list of one or more databases, and receiving, from the user an additional input selecting a given database in the additional list, wherein the source database includes the given database.

In a further embodiment, the method also includes presenting, on the display, an additional list of target environments, and receiving, from the user an additional input selecting a given target environment for the target database, and wherein generating the target database includes generating the target database in the selected target environment.

In some embodiments, the target environment has a specific capacity and includes the target database, and the method further includes computing a size of the subset of the source records in the one of the tables, and presenting, on the display, the capacity and the computed size.

In a supplemental embodiment, the method further includes computing a count of the source records in a given one of the tables, and presenting the count on the display.

In one embodiment, the method further includes computing, a count of the selected subset of the source records in a given one of the tables, and presenting the count on the display.

In an another embodiment, the filtering request includes a maximum number of the source records in the one of the tables.

In an additional embodiment, the filtering request includes sampling coverage for the attribute values in the one of the tables.

In a further embodiment, the source records in the selected tables includes respective sets of attributes that store respective attribute values, and the method further includes presenting, on the display, an additional list of attributes of a given selected table in the source database, receiving an additional input selecting a given attribute in the additional list, and wherein generating the target database includes transforming, in response to receiving the additional input, the attribute values of the given attribute in the selected subset of the source records, and storing the transformed attributes to the target database.

In a supplemental embodiment, the first and the second tables include respective identifiers, and the method further includes presenting, a widget on the display, receiving, from the user, an additional input selecting the widget, and storing, in response to receiving the additional input, the identifiers and the filtering request to a template.

In some embodiments, the method further includes receiving, subsequent to generating the target database, a further input indicating selection of the template, and generating an additional copy of the target database in response to receiving the further input.

In one embodiment, the method further includes presenting a widget on the display, and wherein generating the target database includes adding, in response to receiving, from the user, an additional input selecting the widget, one or more of the selected source records to the target database.

In another embodiment, the method further includes presenting a widget on the display, wherein the target database includes existing target records, wherein the selected source records and the target records include respective sets of attributes that store respective attribute values, and wherein generating the target database includes replacing, in response to receiving, from the user, an additional input selecting the widget, a given attribute value in a given existing target record with a given attribute value in a given selected source record.

In an additional embodiment, the method also includes presenting a widget on the display, wherein the target database includes existing target records, and wherein generating the target database includes deleting, in response to receiving, from the user, an additional input selecting the widget, one or more of the target records.

In a further embodiment, the method further includes presenting a widget on the display, wherein the target database includes existing target records, and wherein generating the target database includes synchronizing, in response to receiving, from the user, an additional input selecting the widget, the target records to the selected source records.

In a supplemental embodiment, the selected subsets of the source records include respective sets of attributes that store respective attribute values, and the method further includes presenting a widget on the display, receiving, from the user, an additional input selecting the widget, and presenting, on the display in response to receiving the additional input, the attribute values in a given subset of the source records.

In some embodiments, the method further includes modifying a given presented attribute value in response to receiving a further input from the user, and presenting, on the display, the modified attribute value.

In one embodiment, the filtering request includes a selection of a subset of the attribute values in a given table.

In an additional embodiment, the method also includes computing a count of the related tables, and presenting the count on the display.

In a further embodiment, the method further includes computing respective counts of related source records in the related tables, and wherein presenting the second list includes presenting the respective counts.

There is also provided, in an embodiment of the present invention, an apparatus, including a display, and at least one processor configured to access a source database including source records stored in multiple tables, which are organized in a hierarchy defining respective parent tables and dependent tables of the tables in the source database, containing respective parent source records and dependent source records of the source records in the tables, each source record in the tables including one or more attribute values, to present, on the display, a first list of the tables, to receive, from a user, a first input selecting a first table in the first list, to present, on the display, a second list of the tables in the source database that are related to the first table by being parent tables or dependent tables of the first table, to receive, from the user, a second input selecting at least one second table in the second list, to present, on the display, filtering criteria for the attribute values in one or more of the tables in a set including the first table and the at least one second table, to receive, from the user, a filtering request for application to the attribute values in one of the tables selected from among the first table and the at least one second table, and to apply the filtering request to the attribute values in the one of the tables so as to select a subset of the source records in the one of the tables and to generate a target database including the selected subset of the source records and the source records in the set of the tables that are the respective parent source records or dependent source records of the source records in the selected subset.

There is additionally provided, in an embodiment of the present invention, a computer software product, the product including a non-transitory computer-readable medium, in which program instructions are stored, which instructions, when read by a computer, cause the computer to access, by a data seeding system, a source database including source records stored in multiple tables, which are organized in a hierarchy defining respective parent tables and dependent tables of the tables in the source database, containing respective parent source records and dependent source records of the source records in the tables, each source record in the tables including one or more attribute values, to present, on a display, a first list of the tables, to receive, from a user, a first input selecting a first table in the first list, to present, on the display, a second list of the tables in the source database that are related to the first table by being parent tables or dependent tables of the first table, to receive, from the user, a second input selecting at least one second table in the second list, to present, on the display, filtering criteria for the attribute values in one or more of the tables in a set including the first table and the at least one second table, to receive, from the user, a filtering request for application to the attribute values in one of the tables selected from among the first table and the at least one second table, and to apply the filtering request to the attribute values in the one of the tables so as to select a subset of the source records in the one of the tables and to generate a target database including the selected subset of the source records and the source records in the set of the tables that are the respective parent source records or dependent source records of the source records in the selected subset.

BRIEF DESCRIPTION OF THE DRAWINGS

The disclosure is herein described, by way of example only, with reference to the accompanying drawings, wherein:

FIGS. 5-14 are block diagrams that show an example of a graphical user interface that can be used to select source records from the source tables to generate the target tables, in accordance with an embodiment of the present invention.

DETAILED DESCRIPTION OF EMBODIMENTS

Figure 1:
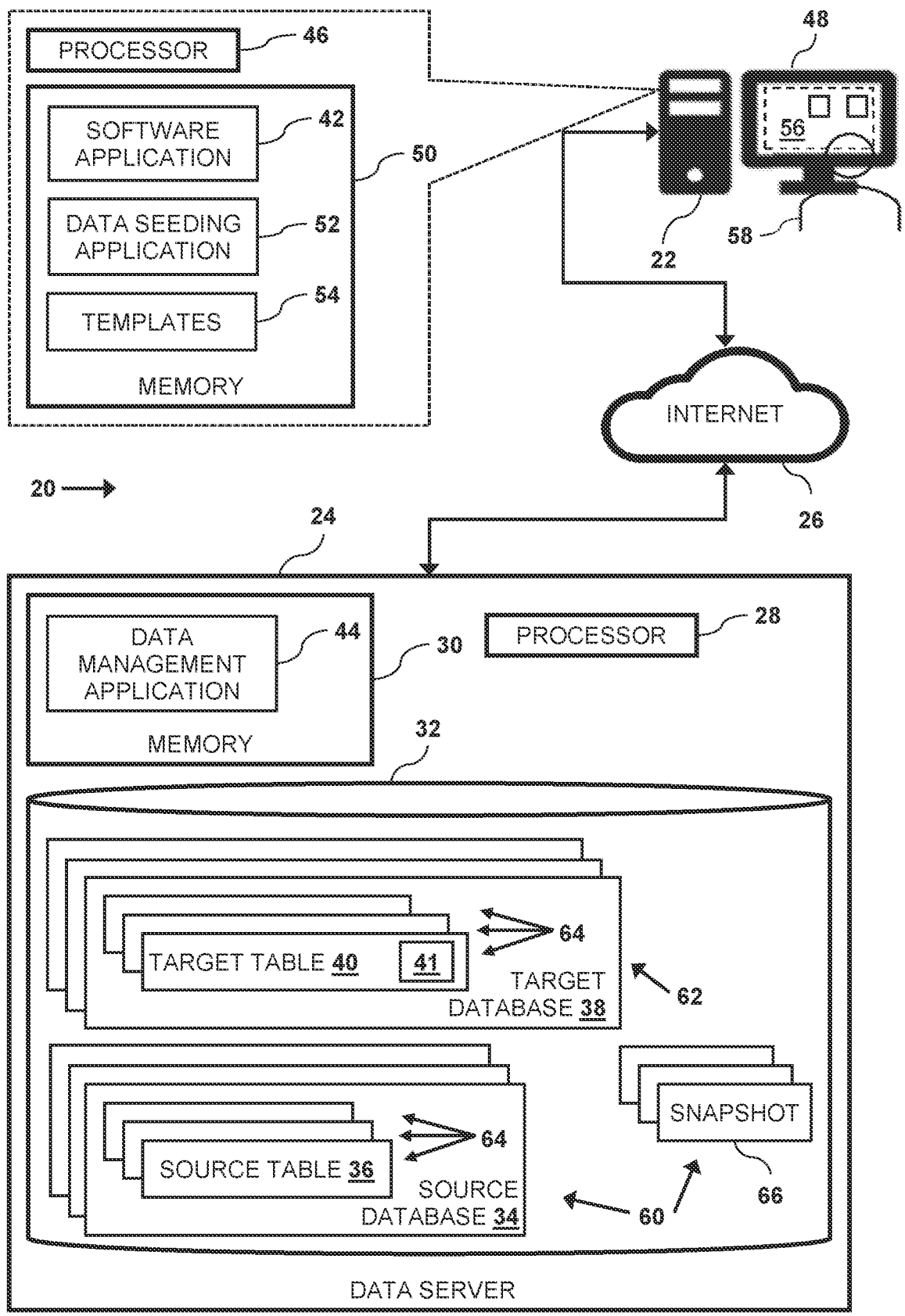
FIG. 1 is a block diagram that shows a computing facility comprising a data seeding system that can extract source records from source tables in a source database so as to generate target tables in a target database, in accordance with an embodiment of the present invention.

There are instances when it is desirable to create target data that is a representative sample of source data. For example, when testing an updated software application, it is important that the test data comprises a representative sample of production data. This can be a complex and time-consuming task, especially when generating target data from a source environment comprising multiple parent and dependent (also known as child) tables. Some techniques that can be used in generating target data for this purpose are described in U.S. patent application Ser. No. 16/503,426, filed Jul. 3, 2019, which is assigned to the assignee of the present patent application and whose disclosure is incorporated herein by reference.

Embodiments of the present invention provide a graphical user interface (GUI) that can be used to access and filter source records in a source database so as to generate a target database that can be used by a software application (e.g., for testing purposes. As described hereinbelow, the source database comprises source records stored in multiple tables, which are organized in a hierarchy defining respective parent tables and dependent tables of the tables in the source database, containing respective parent source records and dependent source records of the records in the tables, each of the source records in the tables comprising one or more attribute values.

To implement the GUI, the source database is accessed by a date seeding system, and a first list of the tables (i.e., the tables in the source database) is presented on a display. Upon receiving, from a user, a first input selecting a first table in the first list, a second list of the tables in the source database is presented on the display. In embodiments of the present invention, the second list comprises any tables that are related to the first table by being parent tables or dependent tables of the first table.

Upon receiving, from the user (i.e., via the GUI), a second input selecting at least one second table in the second list, filtering criteria are presented on the display. In some embodiments, the filtering criteria are for the attribute values in one or more of the tables in a set comprising the first table and the at least one second table.

Subsequent to presenting the filtering criteria, a filtering request is received for application to the attribute values in one of the tables selected from among the first table and the at least one second table. The filtering request can then be applied to the attribute values in the one of the tables so as to select a subset of the source records in the one of the tables and to generate a target database comprising the selected subset of the source records and the source records in the set of the tables that are the respective parent source records or dependent source records of the source records in the selected subset.

Systems implementing embodiments of the present invention can help generate a target database that can be an accurate (and useful) representation of a source database, thereby enabling software application to be tested in a more thorough manner. In one example, embodiments described herein can ensure that any of the selected source records are not orphan records (i.e., the selected dependent source records in the dependent tables have parent source records in their respective parent tables). In another example, embodiments described herein can ensure that the selected parent source records in the parent tables have a representative sample of dependent source records in their respective dependent tables.

In some embodiments, the target database may comprise source records that include system configuration data, and systems implementing embodiments described herein may be used to test the system configuration data. Examples of configuration data include, but are not limited to, pricing rules, validation data for the attribute values (e.g., a list of valid country abbreviations) and attribute value formats.

SYSTEM DESCRIPTION

FIG. 1 is a block diagram that shows an example of a computing facility 20 comprising a data seeding system 22, in accordance with an embodiment of the present invention. In the configuration shown in FIG. 1, computing facility 20 also comprises a data server 24 that is configured to communicate with data seeding system 22 over a data network 26 such as the Internet.

Data server 24 comprises a server processor 28, a server memory 30 and a storage device 32. Storage device 32 stores one or more source databases 34 (e.g., production databases) comprising one or more respective sets of source tables 36, and one or more target databases 38 comprising one or more respective sets of target tables 40 comprising respective target records 41. Source tables 36 store source data that is typically persistently stored and essential to completing day-to-day business tasks and processes. Source tables 36 are described in the description referencing FIG. 2 hereinbelow.

Target tables 40 store target data that can be accessed, for example, by a software application 42 during testing (i.e., execution) of the software application. Upon being updated (e.g., to optimize performance, to add new features or to fix bugs) software application 42 can be tested using target tables 40 before being permitted to access source tables 36.

In some embodiments, tables 36 and 40 have respective table identifiers (IDs) 64. A given table ID 64 may comprise identification information for a given table 36 such as a table name and a name of a given database 34 or 38 that comprises the given table.

The target database typically represents data that affects or is affected by software application 42 while testing. In some instances, the target data can be used for both positive testing to verify that functions in software application 42 produce expected results for given inputs, and for negative testing to test the software application's ability to handle unusual, exceptional or unexpected inputs.

In additional embodiments, storage device 32 can store a set of snapshots 66 that comprise respective states of a given target database 38 at specific times.

In the configuration shown in FIG. 1, memory 30 stores a data management application 44 that processor 28 can execute to enable software application 42 to access source tables 36 and target tables 40. In one example, data management application 44 may comprise a database management system such as a structured query language (SQL) server (e.g., MICROSOFT SQL SERVER™, produced by Microsoft Corporation, One Microsoft Way Redmond, WA 98052-6399 USA), and tables 36 and 40 may comprise database tables. In another example, data management application 44 may comprise a customer relationship management (CRM) system such as SALESFORCE™ (produced by salesforce.com, inc., Salesforce Tower 3rd Floor, 415 Mission Street, San Francisco, CA 94105 USA) and tables 36 and 40 may comprise CRM data files such as standard or custom SALESFORCE™ objects.

Data seeding system 22 comprises a system processor 46, a display 48 and a system memory 50 that stores software application 42, a data seeding application 52, and a set of templates 54. Data seeding application 52 may comprise a graphical user interface (GUI) 56 that processor 46 can present on display 48. User 58 can interact with (e.g., via a keyboard and/or a pointing device such as mouse) to interact with GUI 56 so as to select data that processor 46 can extract from a given source database 34 and store to a given target database 38. The functionality of data seeding application 52 and GUI 56 is described in the description referencing FIGS. 3-8 hereinbelow.

Upon using GUI 56 to define selection criteria that data seeding application 52 to select data for a given target database 38, processor 46 can store the selection criteria to a given template 54. At a subsequent time, user 58 can instruct data seeding application 52 to load the given template, make any necessary modifications, and execute the given template to recreate an additional instance of the given target database.

In some embodiments, data server 24 may comprise one or more source environments 60 and one or more target environments 62. In these embodiments, software application 42 can access a given source database 34 via a given source environment 60 that comprises the given source database, and can access a given target database 38 via a given target environment 62 that comprises the given target database. For example, in addition to utilizing source environments 60 (i.e., where the software application can access and modify a given source database 34) SALESFORCE™ enables software developers to test software applications in a sandbox that comprises an implementation of a given target environment 62.

In some embodiments, a given source environment 60 may comprise a given snapshot 66.

As described supra, data server 24 may comprise multiple target environments 62. Having multiple target environments can enable software developers to test software applications in different sandbox environments having different respective configurations.

In some embodiments, the tasks performed by software application 42 and data seeding application 52 may be split among multiple physical and/or virtual computing devices in computing facility 20. In other embodiments, the tasks performed by software application 42, data seeding application 52 and data management application 44 may be performed in a data cloud.

Examples of memories 30, 50 and storage device 32 include dynamic random-access memories and non-volatile random-access memories. In some embodiments, the memories and/or the storage device may comprise non-volatile storage devices such as hard disk drives and solid-state disk drives.

Processors 28 and 46 comprise general-purpose central processing units (CPU) or special-purpose embedded processors, which are programmed in software or firmware to carry out the functions described herein. This software may be downloaded to server 24 and data seeding system 22 in electronic form, over a network, for example. Additionally or alternatively, the software may be stored on tangible, non-transitory computer-readable media, such as optical, magnetic, or electronic memory media. Further additionally or alternatively, at least some of the functions of processors 28 and 46 may be carried out by hard-wired or programmable digital logic circuits.

Figure 2:
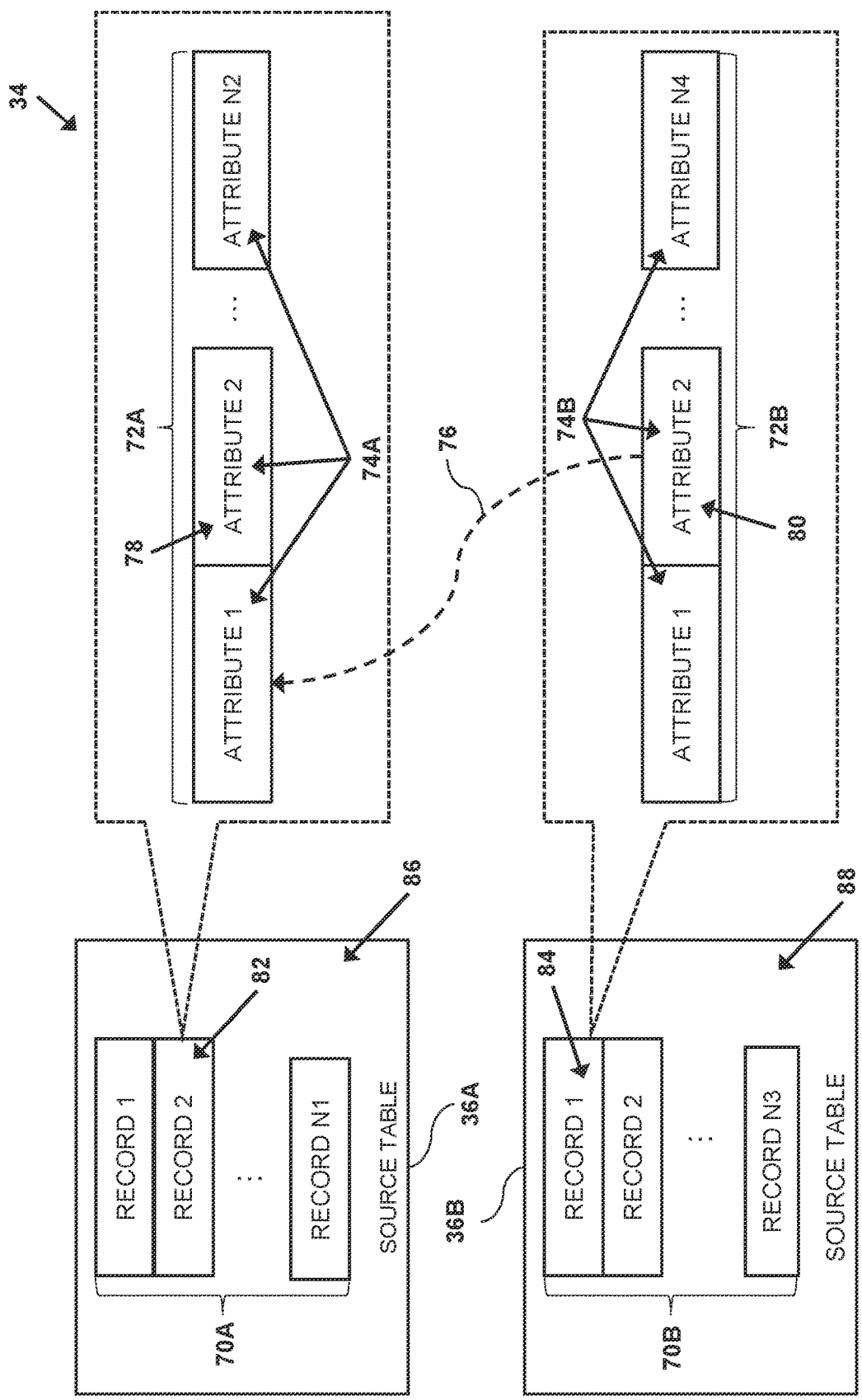
FIG. 2 is a block diagram that shows an example of parent and dependent source records in the source tables, in accordance with an embodiment of the present invention.

FIG. 2 is a block diagram that shows a dependency relationship between two source tables 36, in accordance with an embodiment of the present invention. In the configuration shown in FIG. 2, each source table 36 comprises a respective set of source records 70, and each of the source records comprises a respective set of attributes (also known as fields) 72 that store respective attribute values 74.

In FIG. 2, source tables 36 and their respective components can be differentiated by appending a letter to the identifying numeral, so that the source tables comprise source table 36A and 36B. In this configuration:

Source table 36A comprises a first set of source records 70A, and each source record 70A comprises a first set of attributes 72A storing attribute values 74A.

Source table 36B comprises a second set of source records 70B, and each source record 70B comprises a second set of attributes 72B storing attribute values 74A.

In the example presented in FIG. 2, a given attribute 72B in a given source record 70B in a given table 36B stores a given attribute value 74B that is identical to a given attribute value 74A in a given attribute 72A in a given source record 70A in a given table 36A. In other words, the attribute value 72B "points" to the given source record 70A, as indicated by arrow 76. Therefore:

The given attribute 72A comprises a parent attribute 78 of the given attribute 72B, and the given attribute 72B comprises a dependent attribute 80 (also known as a child attribute) of the given attribute 72A).

The given source record 70A comprises a parent source record 82 of the given source record 70B, and the given source record 70B comprises a dependent source record 84 (also known as a child source record) of the given source record 70A.

The given table 36A comprises a parent table 86 of the given table 36B, and the given table 36B comprises a dependent table 88 (also known as a child table) of the given table 36A.

For example, if table 36A comprises an accounts table and table 36B comprises a contacts table, then the attribute value in the parent attribute may comprise a unique account identifier (ID), and the attribute value in the dependent attribute can store the unique account identifier, thereby "linking" the dependent source record to the parent source record. Using this linking mechanism, the contact table can store multiple contact source records that "point to" a single account source record.

In some embodiments, a parent-dependent relationship may exist for a single table 36. For example, a single "master" account having a corresponding "parent" account source record 70 may have three separate sales regions. In this example, the "dependent" account source records 70 may comprise a given attribute 72 that stores the attribute value referencing the "parent" account.

The following are a few examples of different types of data and metadata that can be stored in attributes 74 of a given table 36:

In a first example, attributes 74 may comprise alphanumeric text. For example, if the given table 36 stores account information, the attribute values may comprise information such as names, addresses and email addresses.

In a second example, attributes 74 may comprise pricing rules, e.g., for an items table 36.

In a third example, attributes 74 may comprise validation rules for the attributes in one or more other source tables 36.

In a fourth example, attributes 74 may comprise formats for the attribute values stored in one or more other source tables 36.

In a fifth example, attributes 74 may comprise relationships (i.e., links) between source records 70 in two different tables 36.

TARGET ENVIRONMENT TABLE GENERATION

Figure 3:
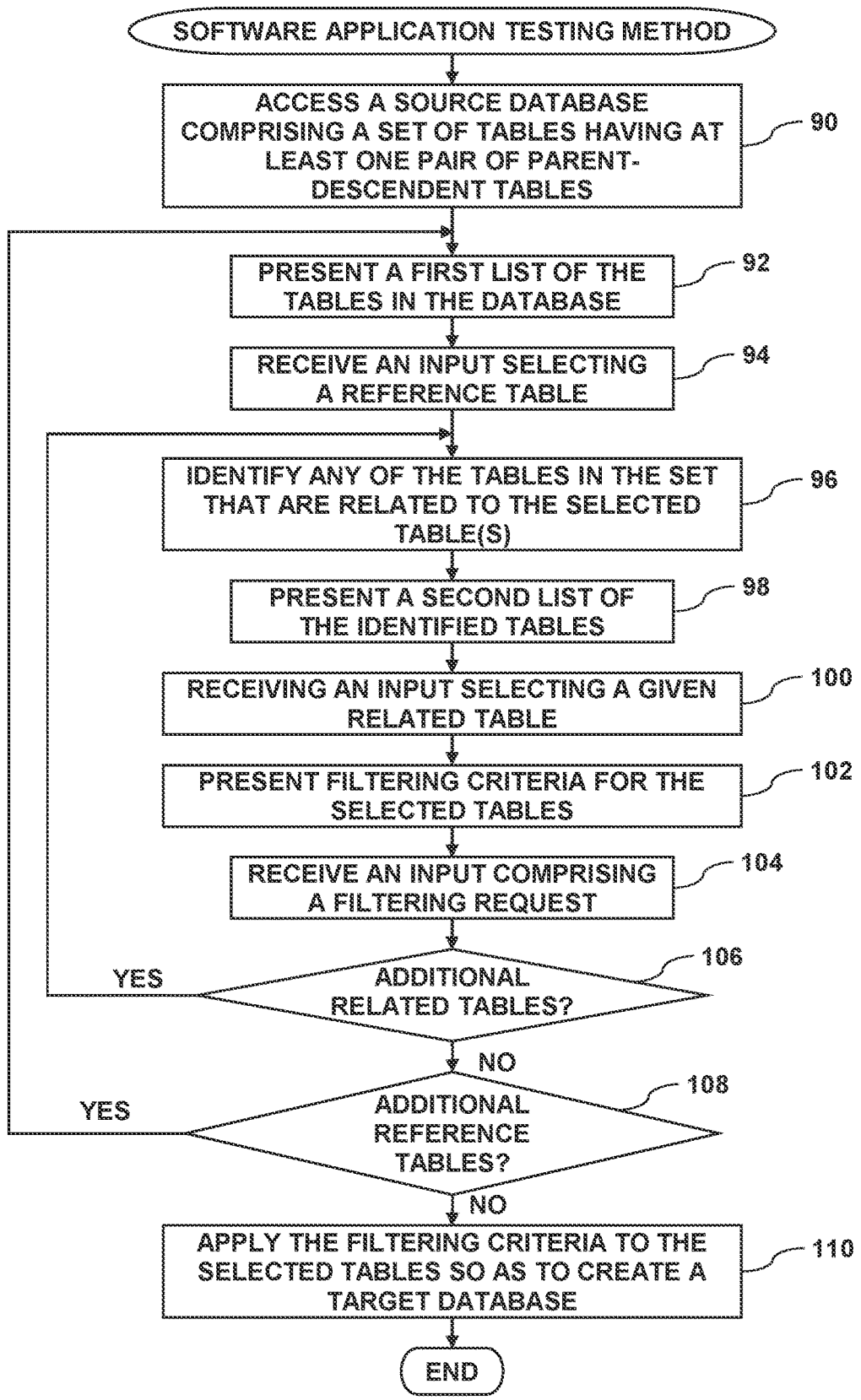
FIG. 3 is a flow diagram that schematically illustrates a method of generating the target tables, and using the target tables in the target environment, in accordance with an embodiment of the present invention.

FIG. 3 is a flow diagram that schematically illustrates a method of generating a given target database 38 that data seeding system 22 can use e.g., for testing software application 42, in accordance with an embodiment of the present invention. In some embodiments, the steps listed below as being performed by data seeding application 52 and/or GUI 56 may also be referred to as being performed by processor 46 or by data seeding system 22. In other embodiments, presenting content in GUI 56 may also be referred to as being presented on display 48.

Prior to performing the steps described in FIG. 3, processor 36 can select, using embodiments described in the description referencing FIG. 8 hereinbelow, a given source environment 60, a given source database 34, a given target environment 62 and a given target database 38.

In embodiments described hereinbelow, user 58 performing a specific operation (e.g., selecting or clicking on or highlighting data or a widget) indicates that processor 46 receives an input (e.g., from a keyboard and/or a pointing device such as a mouse) indicating the user performing the specific operation.

In step 90, data seeding application 52 accesses, on data server 24, the selected source database. As described supra, the selected source database comprises source records 70 stored in multiple source tables 36, which are organized in a hierarchy defining respective parent tables 86 and dependent tables 88 of the source tables in the selected source database, containing respective parent source records 82 and dependent source records 84 of source records 70 in the source tables. Additionally, as described supra, each source record 70 in source tables 36 comprise one or more attribute values 74.

In step 92, data seeding application 52 presents, in GUI 56 on display 48, a first list comprising the source tables in the selected source database 34. As described hereinbelow, processor 46 can receive an input indicating that user 58 selected a given source table 36 from this list. In embodiments described herein, this selected source table is referred to as a reference table. The reference table is simply a "starting point" that user 58 can use to instruct data seeding application for selecting source records 70 that the data seeding application will copy to the selected target database. The reference table may be a given parent table 36 and/or a given dependent table 36 in the selected source database 34.

Figure 4:
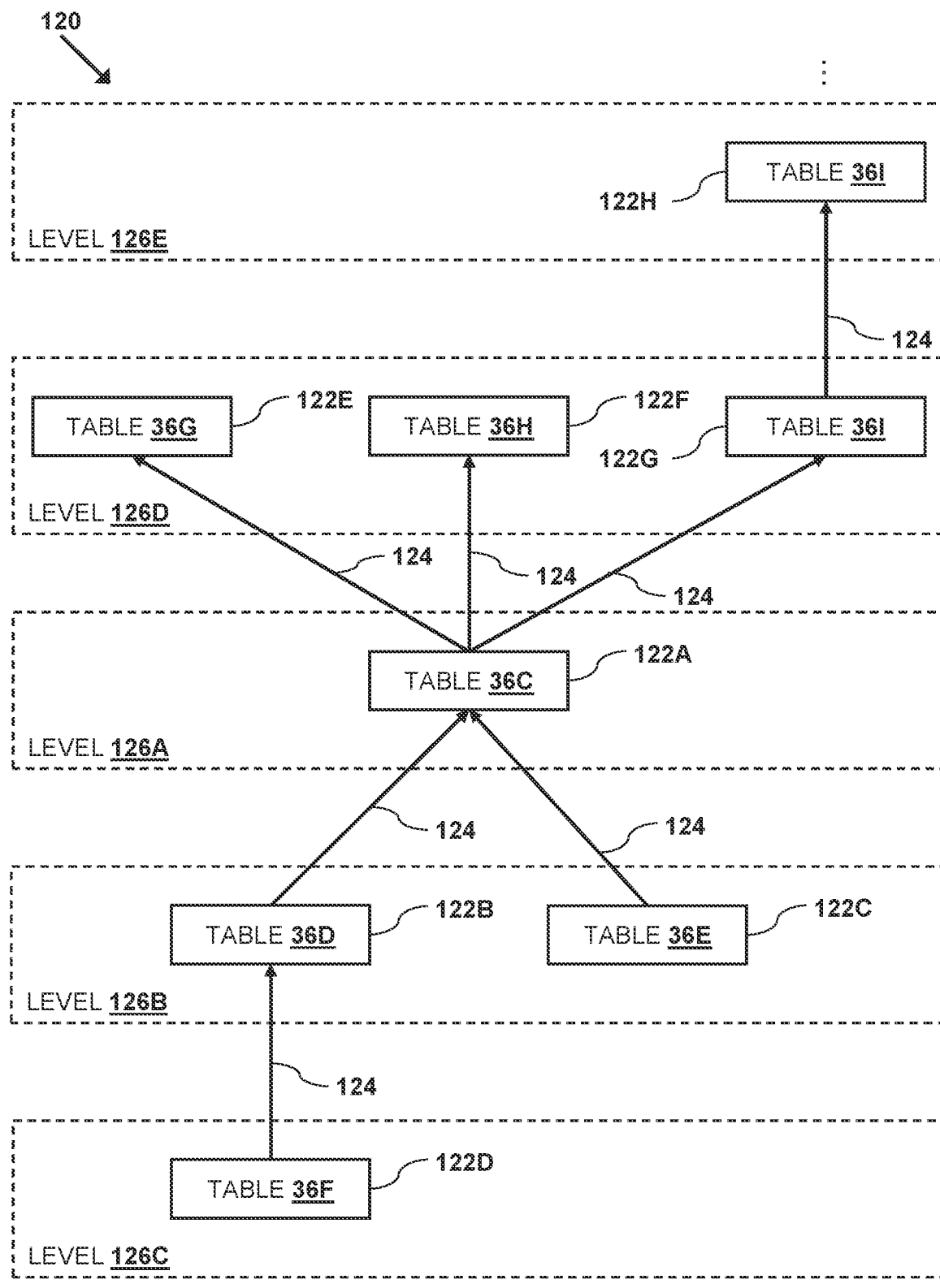
FIG. 4 is a directed graph that shows an example of parent-dependent relationships between a set of source tables, in accordance with an embodiment of the present invention.

FIG. 4 is a block diagram that shows a directed graph 120 that comprising nodes 122 connected by edges 124 and that correspond to source tables 36 in the selected source database 34, in accordance with an embodiment of the present invention. In FIG. 4, source tables 36 and nodes 122 can be differentiated by appending a letter to the identifying numeral, so that the source tables comprise source table 36C-36I, and the nodes comprise nodes 122A-122H. Node 122A corresponds to source table 36C, node 122B corresponds to source table 36D, node 122C corresponds to source table 36E, node 122D corresponds to source table 36F, node 122E corresponds to source table 36G, node 122F corresponds to source table 36H, node 122G corresponds to a first instance of source table 36I and node 122H corresponds to a second instance of source table 36.

As described supra, a single parent-dependent relationship of tables 36 may comprise the same source table 36. An example of this type of relationship comprises the first instance of table 36I in node level 126D and the second instance of table 36I in node level 126E.

Directed graph 120 comprises a plurality of node levels 126 for nodes 122 that correspond to hierarchical levels of the corresponding source tables 36. Node levels 126 can be differentiated by appending a letter to the identifying numeral, so that the node levels comprise node levels 126A-126E.

In the example shown in FIG. 4, node level 126A is a reference level (also known as a root level) comprising node 122A, node level 126B is a first dependent level (i.e., with regard to node level 122A) comprising nodes 122B and 122C, node level 126C is a second dependent level comprising node 122D, node level 126D is a first parent level (i.e., with regard to node level 122A) comprising nodes 122E-122G, and node level 126E is a second parent level comprising node 122H. Therefore:

Source table 36C is a parent of source tables 36D and 36E and is a dependent of source tables 36G-36I.

Source table 36D is a dependent of source table 36C and is a parent of source table 36F.

Source table 36F is a dependent of source table 36D.

Source tables 36G-36I are parents of source table 36C.

Source table 36I in node level 126D is a dependent of source table 36I in node level 126E.

Source table 36I in node level 126E is a parent of source table 36I in node level 126D.

Upon data seeding application 52 presenting the first list of source tables in GUI 56, processor 46 can receive an input indicating user 58 selecting a given source table 36 (i.e., from the first list), and in step 94, the data seeding application receives a first input indicating the selected source table. This selected source table comprises a given reference table.

Figure 5:
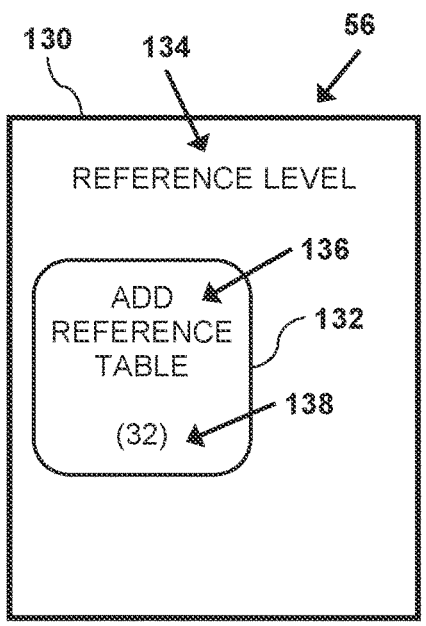

FIG. 5 is a block diagram that shows GUI 56 comprising a dialog box 130 that comprises a GUI widget 132 that user 58 can click to select a given source table 36 as the reference table, in accordance with an embodiment of the present invention.

Dialog box 130 also comprises a table level 134. In the example shown in FIG. 5, table level 134 shows that processor 46 received an input indicating that the user is selecting a given source table 36 as the reference node at the reference level of directed graph 120. A given table level can be a reference level, a dependent level (e.g., dependent level 1, dependent level 2 . . . ) or a parent level (e.g., parent level 1, parent level 2, . . . )

Widget 132 may also comprise messages 136 and 138. In a first widget embodiment, message 136 may comprise text indicating an operation to be performed by data seeding application 52 upon processor 46 receiving an input indicating that user 58 clicked on (i.e., selected) widget 132. In the example shown in FIG. 5 the text comprises "ADD REFERENCE OBJECT". In the first widget embodiment, message 138 indicates a count (i.e. in response to processor 46 computing the count) of source tables 36 in a given source database 34 that are available to be selected as the reference table. A second widget embodiment is described in the description referencing FIG. 7 hereinbelow.

Figure 6:
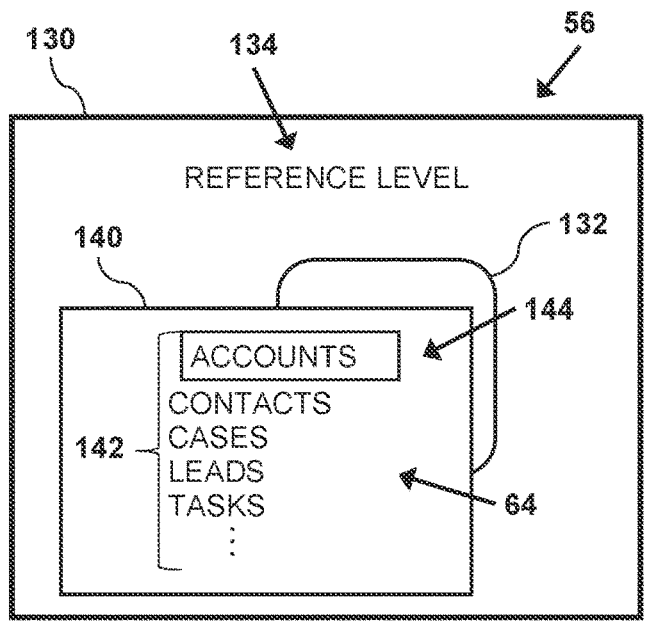

FIG. 6 is a block diagram that shows an example a dialog box 130 comprising a drop-down list 140 of table IDs 64 of the source tables that can be selected by user 58. In the example shown in FIG. 6, processor 46 received an input indicating that user 58 has clicked on (i.e., selected) the highlighted table id "ACCOUNTS" as indicated by arrow 144. In embodiments herein, the source table whose respective table ID 64 comprises "ACCOUNTS" may also be referred to as "ACCOUNTS" table 36.

Returning to the flow diagram, in step 96, data seeding application 52 identifies any of the source tables in the selected source database that are related to the reference table selected in step 94. In some embodiments the related source tables may comprise any source table 36 that is either a parent or a dependent of the selected source table. For example, if the selected source table comprises table 36C as shown in directed graph 120 (in FIG. 4), then the related tables comprise parent tables 36G-36I and dependent tables 36D and 36E.

In step 98, data seeding application 52 presents, in GUI 56 on display 48, a second list comprising the source tables identified in step 96. Upon data seeding application 52 presenting the second list of the source tables, user 58 can interact with GUI 56 to select a given related source table 36 (i.e., from the second list), and in response to processor 46 receiving an input indicating user's selection, the data seeding application can receive, in step 100, second input indicating the selected related source table.

Figure 7:
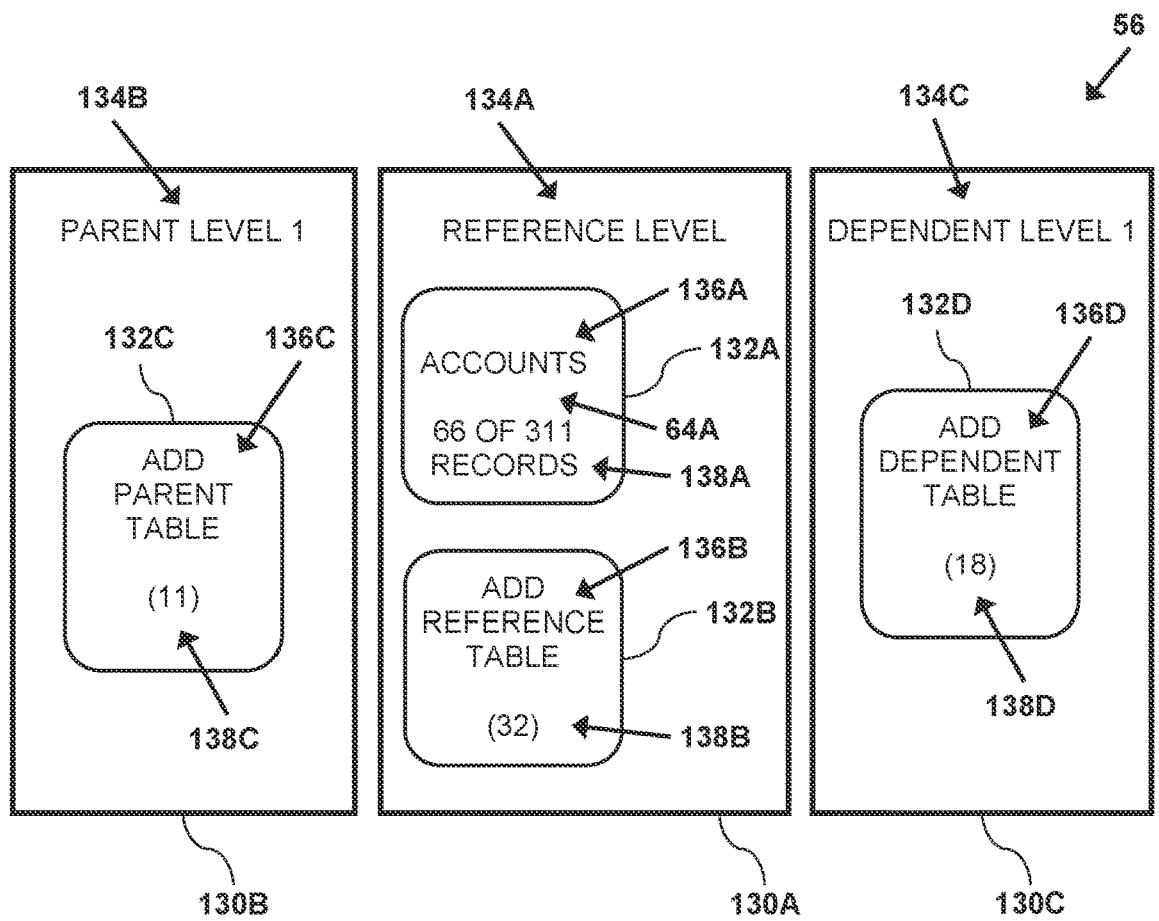
Figure 8:
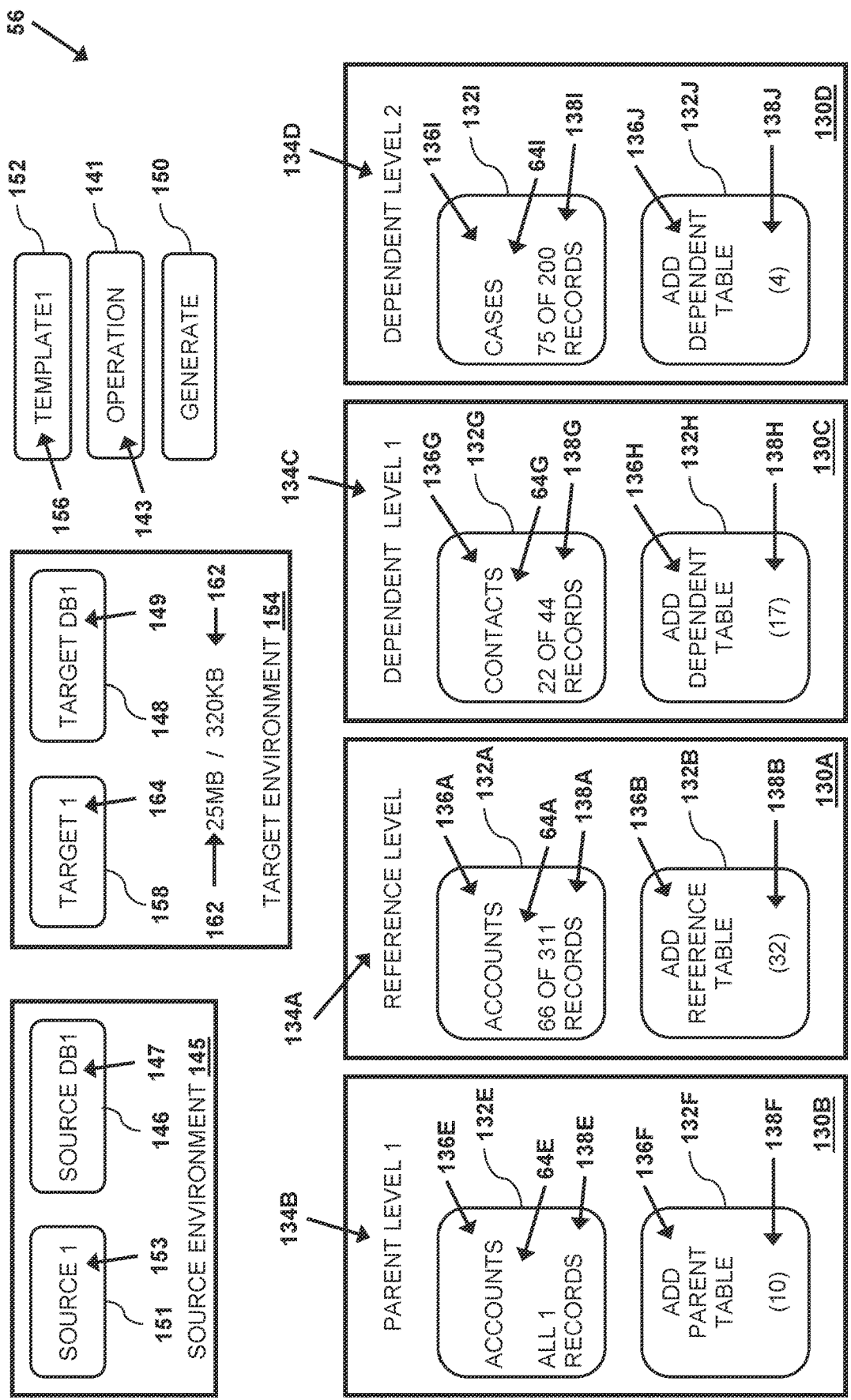

FIGS. 7 and 8 are block diagrams that show an example of GUI 56 that data seeding application 52 can present to user 58 to enable the user to select one or more related source tables 36, in accordance with an embodiment of the present invention. In FIGS. 7 and 8, GUI 56 comprises respective pluralities of dialog boxes 130, each of the dialog boxes comprising one or more widgets 132.

In FIGS. 7 and 8, table IDs 64, dialog boxes 130, widgets 132, table levels 134 and messages 136, 138 can be differentiated by appending a letter to the identifying numeral, so that the table IDs comprise table IDs 64A, 64E, 64G and 64I, the dialog boxes comprise dialog boxes 130A-130D, the widgets comprise widgets 132A-132J, the table levels comprise table levels 134A-134J, and the messages comprise messages 136A-136J and 138A-138J. In a second widget embodiment, each message 136 indicates a given table ID 64 for a given source table 36.

In response to processor 46 receiving an input indicating user 58 selecting the "ACCOUNTS" source table, as shown in FIG. 6, data seeding application 52 can present, to user 58 on display 48, GUI 56 comprising dialog boxes 130A-130C.

In the example shown in FIG. 7, dialog box 130A comprises table level 134A and widgets 132A and 132B. In dialog box 134A presented in FIG. 7:

Table level 134A indicates that dialog box 130A presents selection options for one or more reference level source tables 36. In the example shown in directed graph 120, the reference level comprises node level 126A.

In widget 132A, message 136A indicates that processor 46 received an input indicating user 58 selected the source table whose table ID 64A comprises "ACCOUNTS". User 58 can select this source table using the drop-down list described in the description referencing FIG. 6 hereinabove.

In widget 132A, message 138A indicates that there are 311 source records 70 in the "ACCOUNTS" table, and that data seeding application 52 has currently tagged 66 of those source records for selection. An embodiment for selecting the source records is described in the description referencing FIG. 14 hereinbelow.

In widget 132B, message 136B indicates an ability for processor 46 to add, in response to receiving an input indicating that user 58 clicked widget 132B, an additional source table 36 as an additional reference table. Widget 132B also comprises message 138B indicating that there are source tables 36 available to be selected as the additional reference table.

In the example shown in FIG. 7, dialog box 130B comprises table level 134B and widget 132C. In dialog box 134B presented in FIG. 7:

Table level 134B indicates that dialog box 130B presents selection options for one or more source tables 36 at a first parent level with respect to the "ACCOUNTS" table referenced in message 136A. In the example shown in directed graph 120, the first parent level with respect to the "ACCOUNTS" table referenced in message 136A comprises node level 126D. In the example shown in FIGS. 7 and 8, the "ACCOUNTS" table referenced in message 136A may also be referred to as the selected reference table.

In widget 132C, message 138C indicates an ability for processor 46 to add, in response to receiving an input indicating that user 58 clicked widget 132C, an additional source table 36 as a parent table to the selected reference table. Widget 132C also comprises message 138C indicating that there are 11 source tables 36 available to be selected as a parent table to the selected reference table.

In the example shown in FIG. 7, dialog box 130C comprises table level 134C and widget 132D. In dialog box 134D presented in FIG. 7:

Table level 134C indicates that dialog box 130C presents selection options for one or more source tables 36 at a first dependent level with respect to the selected reference table. In the example shown in directed graph 120, the first dependent level with respect to the selected reference table comprises graph level 126B.

In widget 132D, message 138C indicates, an ability for processor 46 to add, in response to receiving an input indicating that user 58 clicked widget 132D, an additional source table 36 as a dependent table to the selected reference table. Widget 132D also comprises message 138C indicating that there are 18 source tables 36 available to be selected as a dependent table to the selected reference table.

As described supra, in response to processor 46 receiving an input indicating that user 58 clicked widget 132 as shown in FIG. 5, data seeding application 52 can present drop-down list 140 (as shown in FIG. 6) to enable the user to select a given source table 36 as a given reference table, as shown in widget 132A in FIG. 7. Similarly, upon processor 46 receiving an input indicating that user 58 clicked on (i.e., selected) widget 132C, GUI 56 can present, to the user on display 48, an additional drop-down list 140 in dialog box to present the 11 source tables 36 that are parents of t the selected reference table. Likewise, upon processor 46 receiving an input indicating that user 58 clicked on (i.e., selected) widget 132D, GUI 56 can present, to the user in dialog box 132B on display 48, a further drop-down list 140 to present the 18 source tables 36 that are dependents of the selected reference table.

FIG. 8 is a block diagram showing GUI 56 subsequent to processor 46 receiving an input indicating user 58 selecting source tables 36 that are parent and dependent tables of the selected reference table, in accordance with an embodiment of the present invention. In the example presented in FIG. 8:

Processor 46 presents widget 136A in response to receiving an input indicating that user 58 selected a first given source table 36 named "ACCOUNTS" that is a parent table of the selected reference table. Note that the same "ACCOUNTS" table is both the parent and the dependent table, as indicated by widget 136E.

Processor 46 received an input indicating that user 58 selected a second given table 36 whose respective table ID comprises "CONTACTS" (as a dependent table of the selected reference table. In embodiments herein, the source table whose respective table ID 64 comprises "CONTACTS" may also be referred to as "CONTACTS" table 36.

Processor 46 received an input indicating that user 58 selected a third given table 36 whose respective table ID 64 comprises "CASES" as a dependent table of the selected "CONTACTS" table. In embodiments herein, the source table whose respective table ID 64 comprises "CASES" may also be referred to as "CASES" table 36.

GUI 56 comprises dialog boxes 134A-134D, and dialog box 130A is identical to dialog box 130A shown in FIG. 7.

In the example shown in FIG. 8, dialog box 130B comprises table level 134B and widgets 132E and 132F. In dialog box 134B presented in FIG. 8:

Table level 134B in FIG. 8 is identical to table level 134B in FIG. 7.

In widget 132E, processor 46 presents message 136E upon receiving an input indicating that user 58 selected the "ACCOUNTS" table (as indicated by table ID 64E) as a parent table of the selected reference table.

In widget 132E, message 138E indicates that there is a single source record 70 in the "ACCOUNTS" parent table that is a parent source record to the selected source records in the selected reference table, and that data seeding application 52 has currently tagged the single source record for selection.

In widget 132F, message 138F indicates an ability for processor 46 to add, in response to receiving an input indicating that user 58 clicked on (i.e., selected) widget 132C, an additional source table 36 as an additional parent table of the selected reference table.

In widget 132F, message 138F indicates that there are 10 remaining source tables 36 available to be selected as a parent table of the selected reference table.

In the example shown in FIG. 8, dialog box 130C comprises table level 134C and widgets 132G and 132H. In dialog box 134C presented in FIG. 8:

Table level 134C in FIG. 8 is identical to table level 134C in FIG. 7.

In widget 132G, processor 46 presents message 136G upon receiving an input indicating that user 58 selected the "CONTACT" table (as indicted by table ID 64G) as a dependent to the selected reference table.

In widget 132G, message 138G indicates that there are 44 source records 70 in the "CONTACTS" table that are dependent source records to the selected source records in the selected reference table, and that data seeding application 52 has currently tagged 22 of those source records for selection.

In widget 132H, message 138H indicates an ability for processor 46 to add, in response to receiving an input indicating that user 58 clicked on (i.e., selected) widget 132H, an additional source table 36 as an additional dependent table to the selected reference table.

In widget 132H, message 138H indicates that there are 17 remaining source tables 36 available to be selected as a dependent table to the selected reference table.

In the example shown in FIG. 8, dialog box 130D comprises table level 134D and widgets 132I and 132J. In dialog box 134C presented in FIG. 8:

Table level 134D indicates that dialog box 130C presents selection options for one or more source tables 36 at a second dependent level with respect to the selected reference table. In the example shown in directed graph 120, the first dependent level with respect to the selected reference table comprises graph level 126C.

In widget 132I, message 136I indicates that user 58 selected the "CASES" table (as indicated by table ID 64I) as a dependent to the "CONTACTS" table selected in widget 136G.

In widget 132I, message 138I indicates that there are 200 source records 70 in the "CASES" table that are dependent source records to the "CONTACTS" table selected in widget 136G, and that data seeding application 52 has currently tagged 75 of those source records for selection.

In widget 132J, message 138J indicates an ability for processor 46 to add, in response to receiving an input indicating that user 58 clicked on (i.e., selected) widget 132J, an additional source table 36 as an additional dependent table to the "CONTACTS" table selected in widget 136G.

In widget 132J, message 138J indicates that there are 4 remaining source tables 36 available to be selected as an additional dependent table to the "CONTACTS" table selected in widget 136G.

As described supra, data seeding system 22 may store a plurality of templates 54. In one embodiment, template selection widget 152 comprises a GUI "button" that user 58 can press to select a given template 54 referenced by a template ID 156. In this embodiment, upon processor 46 receiving an input indicating that user 58 clicked on (i.e., selected) widget 152, data seeding application can present, in GUI 56, a drop-down list (not shown) of available templates 54, and the user can select a given template 54 from the list.

In another embodiment, processor 46 can receive an input indicating that user 58 selected template selection widget 152 so as to create a new template 54. In this embodiment processor 46 can store, to the new template, information such as selected source database ID 147, selected target database ID 149, table levels 134, respective (i.e., for the table levels) table IDs 64, and a filtering request. The filtering request is described in the description referencing FIG. 14 hereinbelow.

Therefore, user 58 can use widget 152 to instruct data seeding application 52 to create a new template 54 or to reuse an existing template 54 when updating (as described hereinbelow) a given target database 38, or creating a new copy (i.e., in a new/different target environment 62) of the given target database. In some embodiments, templates 54 are not "tied down" to any specific source environments 60 or any specific target environments 62, and can therefore use any available environments in computing facility 20 for the source and the destination environments.

In the configuration shown in FIG. 8, source environment dialog box 145 comprises a source environment selection widget 151 that user 58 can engage (i.e., "click on") so as to select a given source environment 60 referenced by a selected source environment ID 153. In some embodiments, upon processor 46 receiving an input indicating that user 58 clicked on (i.e., selected) widget 151, GUI 56 can present, on display 48, a drop-down list of source environment identifiers (not shown) referencing available source environments 60, and the user can select a given source environment 60 from the list, (and thereby generating an input that processor 46 can receive so as to select) a given source environment identifier referencing a given source environment 60. In some embodiments, the source environment identifiers in the drop-down list may also reference one or more target environments 62, so that the selected source environment ID 153 references a given target environment 62.

In the configuration shown in FIG. 8, source environment dialog box 145 also comprises a source database selection widget 146 that user 58 can "click on" so as to select a given source database 34 referenced by a selected source database ID 147. In this some embodiments, upon processor 46 receiving an input indicating that user 58 clicked on (i.e., selected) widget 146, GUI 56 can present, on display 48, a drop-down list of source database identifiers (not shown) referencing available source databases 34, and the user can select, from the list, a given source database identifier referencing a given database 34, thereby generating an input that processor 46 can receive indicating the selection.

In the configuration shown in FIG. 8, target environment 154 also comprises a target database selection widget 148 that user 58 can "click on" so as to select a given target database 38 referenced by a selected target database ID 149. In this some embodiments, upon processor 46 receiving an input indicating that user 58 clicked on (i.e., selected) widget 148, GUI 56 can present, on display 48, a drop-down list of target database identifiers (not shown) referencing target databases 34, and the user can select, from the list, a given target database identifier referencing a given database 38, thereby generating an input that processor 46 can receive indicating the selection.

In some embodiments, dialog box 154 may also comprise an additional GUI widget (not shown) that enables user 58 to select a given source environment 60 that comprises the selected target database 38, thereby generating an input that processor 46 can receive indicating the selection. For example, the selected source environment may comprise a given source environment 60 or an additional target environment 62.

The configuration shown in FIG. 8, enables user 58 to use a given template 54 (i.e., as selected using widget 152) to create target databases 38 in one or more target environments 62.

In one embodiment, upon processor 46 receiving an input indicating that user 58 clicked on (i.e., selected) a given widget 132 whose respective message 136 comprises a given source table 36 (widgets 132A, 132E, 132G and 132I in the example shown in FIG. 8), data seeding application 52 can present, on display, the selected attribute values (i.e., as indicated by message 138G) in the given source table.

In another embodiment, user 58 can use GUI 56 to create a given target database 38 having multiple tables 36, the sets comprising respective reference tables 36 (i.e., in dialog box 130A). In this embodiment, in response to processor 46 receiving an input indicating that user 58 clicked on (i.e., selected) a given widget 132 whose respective message 136 comprises a given source table 36, GUI 56 can highlight all the widgets 132 whose respective messages 136 reference the source tables in the same set as the given source table.

In the configuration shown in FIG. 8, GUI 56 presents, on display 48, parent levels of the reference level on the left side of the reference level (i.e., dialog box 130B), and dependent levels of the reference level on the right side of the reference level (i.e., dialog boxes 130C and 130D). In an additional embodiment, in response to processor 46 receiving an input that user 58 clicked, in dialog boxes 130B, 130C or 130D, on a given widget 132 whose respective message 136 comprises a given source table 36, the GUI can open a new window (not shown) that enables the user to view and select an additional source table 36 that is related to the given source table. For example, this additional embodiment enables user 58 to select a child table 36 to the "ACCOUNTS" source table 36 in widget 132E, or to select a parent table 36 to the "CASES" source table 36 in widget 132I.

In a further embodiment, GUI 56 may enable user 58 to define a strong reference between a given parent table 36 and a given dependent table 36 of the given parent table. In this embodiment, user 58 can instruct (i.e., by generating, via GUI 56, an input to) data seeding application 52 to select a given source record 70 in the given parent table only if there is a dependent source record 70 of the given source record in the given child table (i.e., a mandatory child source record). Likewise, user 58 can instruct (i.e., by generating, via GUI 56, an input to) data seeding application 52 to select a given source record 70 in the given dependent table only if there is a parent source record 70 of the given dependent source record in the given parent table (i.e., a mandatory parent source record). In some embodiments, the relationship between given parent table and the given dependent tables may be more than 1 level apart (e.g., tables 36C and 36F in FIG. 4).

In the configuration shown in FIG. 8, GUI 56 also comprises an "OPERATION" selection widget 141, a "GENERATE" widget 150, a template selection widget 152, a given source environment dialog box 145, and a target environment dialog box 154. In response to processor 46 receiving an input indicating that user 58 clicked on (i.e., selected) widget 150, data seeding application 52 can generate, in the selected target environment, the selected target database (i.e., comprising the selected target tables based on the selected source tables in the selected source database in the selected source environment) by applying any record selection (i.e., filtering) criteria that the user selected for the selected source tables, and any other criteria that the user selected in the GUI presented in FIG. 8 (e.g., via widget 141, as described hereinbelow). Selection criteria are described in the description referencing FIG. 14 hereinbelow.

Upon processor 46 receiving an input indicating that user 58 clicked on (i.e., selected) widget 141, GUI 56 can present, for widget 141 (i.e., on display 48), a dialog box (not shown) presenting the following operations:

"ADD". Upon processor 46 receiving an input indicating that user 58 clicked on (i.e., selected) the "ADD" operation and receiving a second input indicating that the user clicked on widget 150, the processor can add the selected source records to target tables 40 in the selected target database.

"UPSERT". Upon processor 46 receiving an input indicating that user 58 clicked on (i.e., selected) the "UPSERT" operation and receiving a second input indicating that the user clicked on (i.e., selected) widget 150, the processor can update target records 41 in existing target tables 40 with the attribute values in the selected source records that have matching source records 70 (e.g., via a common key value). Criteria for the "updating source records 70 are described in the description referencing FIG. 11 hereinbelow. In addition to updating source records 70, the upsert operation can add, to the target tables, any new source records 70 in the source tables (i.e., that do not already exist in the target tables)

"CLEAN AND INSERT". Upon processor 46 receiving an input indicating that user 58 clicked on (i.e., selected) the "DELETE" operation and receiving a second input indicating that the user clicked on (i.e., selected) widget 150, the processor can delete, from the target tables, all target records 41 in target tables 40. Upon deleting the target records, processor 46 can add the selected source records to target tables 40.

"SYNC". Upon processor 46 receiving an input indicating that user 58 clicked on (i.e., selected) the "SYNC" operation and receiving a second input indicating that the user clicked on (i.e., selected) widget 150, processor 46 can synchronize the source tables and the target tables by synchronizing target records 41 to the selected source records in the source tables. In a first synchronization embodiment, processor 46 can synchronize the source and the target tables by adding, to the target tables, any of the source records that do not match any target records 41. In a second synchronization embodiment, processor 46 can synchronize the source and the target tables by updating existing target records 41 with attribute values 74 in matching selected source records 70. In a third synchronization embodiment, processor 46 can synchronize the source and the target tables by deleting any target records 41 that do not match any of the selected source records.

FIGS. 9-11 are block diagrams that illustrate an example of an option widget 155 that GUI 56 can embed within a given GUI widget 132, in accordance with an embodiment of the present invention. In the example presented in FIGS. 8-10, the given GUI widget comprises widget 132G as described in the description referencing FIG. 8 hereinabove.

Upon processor 46 receiving an input indicating that user 58 clicked on (i.e., selected) option widget 155, GUI 56 can present (FIG. 10), on display 48, an option widget 157 that comprises one or more options that user 58 can select. In the configuration shown in FIG. 10, options 159 comprise:

"FILTER". If processor 46 receives an input indicating user 58 selected this option, then GUI 56 can present, to the user on display 48, filtering options for the selected source table represented by message 136 (i.e., in the given GUI widget 132), as described in the description referencing FIG. 14 hereinbelow.

"SHOW RECORDS". If processor 46 receives an input indicating user 58 selected this option, the GUI can present, on display 48, the filtered source records in the selected source table, as described in the description referencing FIG. 11 hereinbelow.

"ADD PARENTS". If processor 46 receives an input indicating user 58 selected this option, then GUI 56 can present an option (not shown) for the user to select an additional parent source table 36 for the selected source table. In the configuration shown in FIG. 8, table levels 134 are for a main hierarchy that originates from reference level 134A. The "ADD PARENTS" option enables user 58 to define additional sub-hierarchies.

In a similar manner, if the selected source table comprises a parent of a given source table 36 in reference level 134A, this option can enable user 50 to select an additional dependent (i.e., child) table 36 for the selected source table.

"REMOVE". If processor 46 receives an input indicating user 58 selected this option, then GUI 56 can remove the selected source table from table level 138.

FIG. 11 is a block diagram showing an example of a sample window 168, that GUI 56 can present on display 48 in response to processor 46 receiving an input indicating user 58 selected "SHOW RECORDS" option 157, in accordance with an embodiment of the present invention. In the configuration shown in FIG. 11, sample window 168 can present attribute IDs 161 that reference respective attributes 72, and their corresponding attribute values 74 for the selected source records 70 in a given source table 36.

In one embodiment, user 58 can select a subset of attributes 72 for the selected source records in the given source table, and upon processor 46 receiving an input indicating that user 58 clicked on (i.e., selected) widget 150, the processor can generate a given target table with source records 70 that comprise the selected subset of the attributes (i.e., and does not comprise any other attributes 72 from the source records in the given source table). In this embodiment, user 58 can select the subset of attributes 72 by clicking on and thereby highlighting one or more attribute IDs 161, and processor 46 can select the subset in response to receiving an input indicating the user highlighted the one or more attributes.

As described in the description referencing FIG. 8 hereinabove, processor 46 can update specific attribute values in the target records of an existing target table 40 in response to the processor receiving an input indicating that user 58 clicked on (i.e., selected) the "UPDATE" option in widget 141. In this embodiment, user 58 can select a given attribute value 74 in the given source table by clicking on, in sample window 168, and thereby highlighting the given attribute value. In response to receiving an input indicating the user highlighted the given attribute value, processor 46 can update the corresponding attribute value in the target table corresponding to the given source table.

In another embodiment, user 58 can modify a given attribute value that processor 46 presents in sample window 168. In this embodiment, user can use a mouse and a keyboard (not shown) to highlight and change the given attribute value in sample window 168, and upon processor 46 receiving an input indicating the change to the given attribute value, the processor can update the modified attribute value in the given source table, and present the modified attribute value in sample window 168. FIGS. 12 and 13 are block diagrams that illustrate an example of a selection status widget 163 that GUI 56 can embed within a given GUI widget 132 on display 48, in accordance with an embodiment of the present invention. In the example presented in FIGS. 12-13, the given GUI widget comprises widget 132I as described in the description referencing FIG. 8 hereinabove.

In the configuration shown in FIG. 12, status widget 163 comprises a value 165 that indicates a count (i.e. in response to processor 46 computing the count) of parent tables 36 (i.e., for the selected source table referenced by table ID 641 in message 136 (i.e., in the given GUI widget 132) that user 58 selected via GUI 56 (and processor 46 receives a corresponding input indicating the selection) as parent tables 36 for the selected source table, wherein the parent tables (i.e., for the selected source table) are not included in the main hierarchy.

In some embodiments, upon processor 46 receiving an input indicating that user 58 clicked on (i.e., selected) widget 163, GUI 56 can present, on display 48, the selection status widget, in the configuration shown in FIG. 13. In its expanded configuration, GUI 56 can present, in widget 163 on display 48, names 166 of the (non-main hierarchy) parent tables for the selected source tables, and the respective counts 167 of the selected (i.e., filtered) source records 70 in the parent tables.

In the example presented in FIGS. 12 and 13, table level 134I comprised a dependent of reference level 134A. In the event the table level for the selected source table is a parent of reference level 134A, then GUI 56 can present, on display 48, widget 163 so as to enable user 58 to view the status of child tables 36 of the selected source table.

Returning to the flow diagram, in step 102, data seeding application 52 presents filtering criteria for the attribute values in one or more of source tables 36 in a set comprising the selected source tables (i.e., the selected reference table and at least one selected related table 36). In some embodiments, data seeding application 52 can present the filtering criteria for a given selected source table in response to processor 46 receiving an input indicating that user 58 clicked (i.e., selected) on a given widget 132 comprising the given selected source table (e.g., as noted in message 136). In the example shown in FIG. 8, data seeding application 52 can present filtering criteria in response to processor 46 receiving an input indicating that user 58 clicked on (i.e., selected) widgets 136A, 136E, 136G or 136I.

In step 104, data seeding application 52 receives, from user 58 via GUI 56, a filtering request for application to the attribute values in one of the source tables selected from among the selected reference table 36 and the at least one selected related table 36. In embodiments described herein, the filtering request comprises filtering criteria specified by user 58 in filter dialog box 170.

Figure 14:
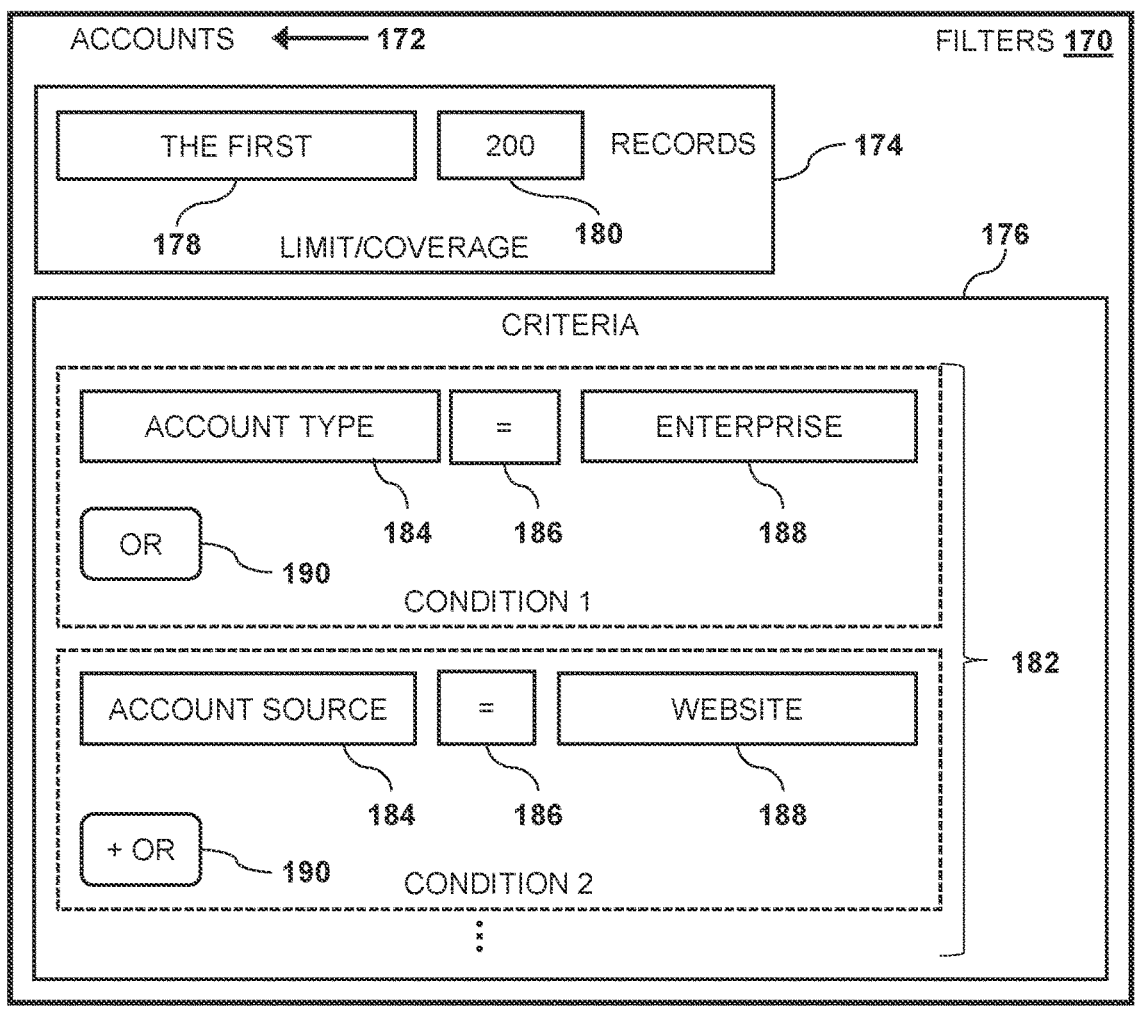

FIG. 14 is a block diagram showing a filtering dialog box 170 that data seeding application 52 can present in GUI 56 on display 48, thereby enabling user 58 to define a filtering request for the attribute values in the selected source tables, in accordance with an embodiment of the present invention. In some embodiments, data seeding application 52 can present dialog box 170 in response to processor 46 receiving an input indicating that user 58 clicked on (i.e., selected) a given widget 132 comprising the given selected source table. In some embodiments, data seeding application 52 can use the defined filtering criteria to select respective subsets of the selected source tables.

In the example shown in FIG. 14, dialog box 170 comprises a table ID 172, and the filtering request that user 58 can specify comprises user-specified criteria in a limit coverage dialog box 174 and a filter criteria dialog box 176. Table ID 172 references a given source table 36. In the example shown in FIG. 14, the given source table comprises the "ACCOUNTS" source table.

In some embodiments, dialog box 174 may comprise a limit type 178 and a limit number 180 (i.e., a maximum number of the records). In the example shown in FIG. 14 the limit type comprises "THE FIRST" and the limit number comprises "200". Therefore, when data seeding application 52 applies the selection criteria selected in dialog box 170, the data seeding application will select the first 200 of the source records in the given source table that meet the filtering criteria defined in dialog box 174.

In some embodiments, dialog box 174 comprises one or more conditions 182, each of the conditions comprising a filter value 184 referencing a given attribute value 74 (stored in a given attribute 72), a comparison operator 186 (e.g., "=", ">", "<"), a value 188 and a logical operator 190 (e.g., "AND", "OR"). In the example shown in FIG. 14, the conditions comprise:

(ACCOUNT TYPE=ENTERPRISE) OR (ACCOUNT SOURCE=WEBSITE)

wherein "ACCOUNT TYPE" and "ACCOUNT SOURCE" are attributes 72 in the "ACCOUNTS" table, wherein "ENTERPRISE is a given value for "ACCOUNT TYPE", and wherein "WEBSITE" is a given value for "ACCOUNT SOURCE". Therefore, in response to the filtering criteria defined in dialog box 170, data seeding application 52 will select the first 200 source records 70 in the "ACCOUNTS" table whose respective "ACCOUNT TYPE" comprises "ENTERPRISE" or whose respective "ACCOUNT SOURCE" comprises "WEBSITE".

An additional example of criteria that can be defined in limit coverage dialog box 174 comprises sampling coverage for the attribute values in a given attribute 72. In embodiments described herein, sampling coverage comprises specifying a minimum number of source records (i.e., in a given source table 36) for each distinct attribute value 74 stored in a given attribute 72. For example, if there are four different values for "ACCOUNT TYPE", user 58 can instruct data seeding application 52 to select a minimum number (e.g., five) of source records 70 for each of the possible values for "ACCOUNT TYPE".

In another embodiment (not shown) data seeding application 52 can present, to user 58 in GUI 56 on display 48, an option to transform the attribute values stored in any attribute 72 in any source record 70 of the selected source tables. Transforming data is also known as anonymizing or masking the data. Transforming attribute values 74 can be useful when generating target tables 40 from source tables 36 that store sensitive information such as phone numbers, email addresses, tax IDs and credit card numbers.

Examples of attribute value transformations that data seeding application 52 can perform include, but are not limited to:

Replace a given attribute value 74 with blank values. For example, if a given attribute 72 comprises a name and the attribute value for the given attribute is "John Smith", data seeding application 52 can transform the attribute value to " ".

Replace a given attribute value 74 with arbitrary (i.e., random) values. In one example, if a given attribute 72 comprises a name and the attribute value for the given attribute is "John Smith", data seeding application 52 can transform the attribute value to "sdkf jdfhz". In another example, if a given attribute 72 comprises an email address and the attribute value for the given attribute is "John@company.com", data seeding application 52 can transform the domain name in email address so that the transformed attribute value is "John@FakeCo.com". In the second example, data seeding application 52 transforms a specific portion of the attribute value (e.g., a domain name).

Replace a given attribute value 74 in a first language with a replacement attribute value in a second language. For example, if a given attribute 72 comprises an English name and the attribute value for the given attribute is "John Smith", data seeding application 52 can transform the attribute value to a German name "Max Mustermann". In some embodiments, data seeding application 52 can maintain, in memory 50, a list (not shown) of the attribute values in the second language.

Replace a given attribute value 74 with patterns based on the given attribute value. For example, if a given attribute 72 comprises a name and the attribute value for the given attribute is "John Smith", data seeding application 52 can transform the attribute value to "First J Last S".

Replace a given attribute value 74 with a text operation that data seeding application 52 can perform on the given attribute value. Examples of the text operations include, but are not limited to, trimming text and replacing characters.

Type specific transformations. In a first example, if that attribute value in given attribute 72 comprises numeric or currency data, data seeding application 52 can perform transform the attribute values by performing a mathematical operation (e.g., add a specific value, subtract a specific value, multiply by a specific value, or divide by a specific value) on the attribute value. In a second example, if that attribute value in given attribute 72 comprises a date, data seeding application 52 can perform transform the attribute values by performing a date operation (e.g., add a specific number of days or subtract a specific number of days) on the attribute value.

In step 106, data seeding application 52 determines whether or not that user 58 wants to select any additional source tables 36 as a related (i.e., parent or dependent) table to any of the selected source tables (i.e., in steps 94 and 100). In some embodiments, data seeding application 52 can determine that user 58 wants to select any additional related source tables 36 by processor 46 receiving an input indicating that user 58 clicked on (i.e., selected) a given widget 132 whose respective message 136 comprises either "ADD DEPENDENT TABLE" (e.g., widgets 132H or 132J in FIG. 8) or "ADD PARENT TABLE" (e.g., widget 132F in FIG. 8).

If data seeding application 52 determines that user 58 wants to select any additional related source tables 36, then the method continues with step 96. However, if data seeding application 52 determines that user 58 does not want to select any additional related source tables 36, then in step 108 the data seeding application determines whether or not the user want to select any of the source tables as an additional reference table.

In some embodiments, data seeding application 52 can determine that user 58 wants to select an additional reference table by processor 46 receiving an input indicating that user clicked on (i.e., selected) a given widget 132 whose respective message 136 comprises "ADD REFERENCE TABLE" (e.g., widget 132B in FIG. 8). Alternatively, data seeding application 52 can determine that user 58 does not want to select an additional reference table by processor 46 receiving an input indicating that user 58 clicked on (i.e., selected) widget 150.

If data seeding application 52 determines that user 58 wants to select an additional source table 36 as an additional reference table, then the method continues with step 92. However, if data seeding application 52 determines that user 58 is finished selecting any reference tables, then in step 110, data seeding application 52 applies the received filtering request to the selected reference and related source tables so as to select a subset of the source records in the selected set of source tables, thereby generating the selected target database, and the method ends. In embodiments of the present invention, the selected target database comprises the selected subset of the source records in the selected set of source tables. In some embodiments, the selected target database may also include the source records in the selected set of source tables that are the respective parent source records 70 or dependent source records 70 of the source records in the selected subset of the source records.

Figure 15:
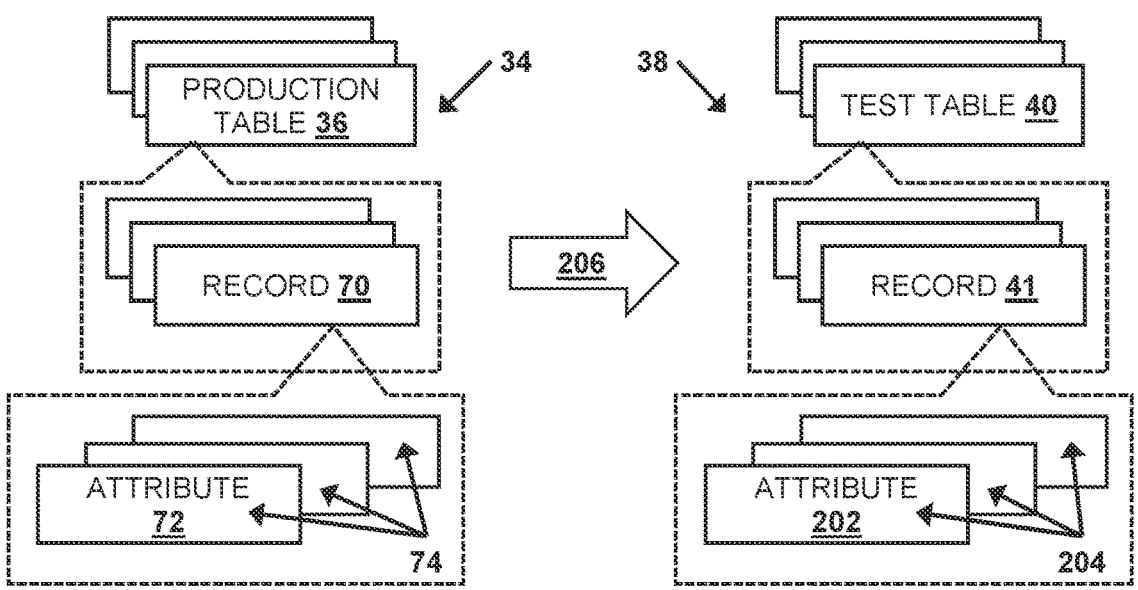
FIG. 15 is a block diagram that schematically illustrates generating the target database from the source database, in accordance with an embodiment of the present invention.

FIG. 15 is a block diagram that schematically illustrates generating a given target database 38 from a given source database 34, in accordance with an embodiment of the present invention. Target tables 40 comprise respective sets of target records 41. Each target record 41 comprises a set of target attributes 202 that store respective attribute values 204. In some embodiments, data seeding application 52 can generate the given target database by copying attribute values 74 in the selected subset of source records 70 to attribute values 204 in corresponding target records 41, as indicated by an arrow 206.

Data seeding application 52 can then generate target tables 40 in the given target database by migrating the selected subsets of the source records from source tables 36 in the selected source environment to target tables 40 in the target environment indicated by environment ID 164. Upon generating the target tables, each of the target tables has a corresponding source table 36. In addition to storing a copy of the selected subsets of the source records, the target tables in the given target database can maintain the same parent-dependent relationship (e.g., as shown in FIG. 8) as the corresponding source tables in the given source database.

In one embodiment, computing facility 20 can use a given target database 38 as (i.e., a partial or a targeted) backup of a given source database 34. In this embodiment, data seeding system 22 may copy the given target database 38 to a remote site (not shown).

In another embodiment, upon generating the selected target database 38 in the selected target environment, user 58 can instruct data seeding system 22 to start testing software application 42 by registering the software application with the selected target environment (e.g., by providing credentials and/or setting permissions), executing the software application with the attribute values stored in in the selected target environment (i.e., comprising the target tables in the selected target database). Upon successfully completing the testing, user can register the software application with the selected source environment, start executing software application 24 in the selected source environment comprising source database 34.

In an additional embodiment, upon generating the selected target database 38 in the selected target environment 62, user 58 can register software application 42 with the generated (or updated) the selected target database, and provide the selected target environment for training one or more new users (not shown).

In a further embodiment, a goal for creating any given target database 38 may be to clone a given source database 34.

While, for simplicity purposes, the steps in the flow diagram describe user 58 interacting with the widgets in GUI 56 in a specific order, it is understood that the GUI is typically event driven, thereby allowing the user to click on the widgets in a different order when selecting the subsets of the source records to migrate to a given target database 38.

Additionally, while the steps in FIG. 3 describe an embodiment where data seeding application 52 transforms attribute values 74 prior to generating a given target database 38, transforming the attribute values subsequent to generating the given target database is considered to be within the spirit and scope of the present invention. In one alternative embodiment, data seeding application 52 can update the attribute values in a given target database 38 with the transformed attribute values. In another alternative embodiment, data seeding application 52 can copy a given target database 38 to a second copy of the target database (not shown) that comprises the transformed attribute values.

Furthermore, while embodiments herein describe using a given source database 34 in a given source environment 60 to create a given target database 38 in a given target environment 62, using an existing first target database 38 in a first target environment 62 (i.e., as a source database in a source environment) to create a second database 38 in a second target environment 62 is considered to be within the spirit and scope of the present invention.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for generating target data for a software application to run in a target environment having a specific capacity, the method comprising:
  accessing, by a data seeding system, a source database comprising source records stored in multiple tables, which are organized in a hierarchy defining respective parent tables and dependent tables of the tables in the source database, containing respective parent source records and dependent source records of the source records in the tables, each source record in the tables comprising one or more attribute values;
  presenting, on a display, a first list of the tables;
  receiving, from a user, a first input selecting a first table in the first list;
  presenting, on the display, a second list of the tables in the source database that are related to the first table by being parent tables or dependent tables of the first table;
  receiving, from the user, a second input selecting at least one second table in the second list;
  presenting, on the display, filtering criteria for the attribute values in one or more of the tables in a set comprising the first table and the at least one second table;
  receiving, from the user, a filtering request for application to the attribute values in one of the tables selected from among the first table and the at least one second table;
  applying the filtering request to the attribute values in the one of the tables so as to select a subset of the source records in the one of the tables;
  computing a size of the subset of the source records together with the parent source records and dependent source records selected from the first table and the at least one second table;
  presenting, on the display, the computed size together with the specific capacity of the target environment; and
  generating, in the target environment, a target database comprising the selected subset of the source records and the source records in the set of the tables that are the respective parent source records or dependent source records of the source records in the selected subset.

2. The method according to claim 1, wherein a given table comprises a customer relationship management data file.

3. The method according to claim 1, and further comprising presenting, on the display, an additional list of one or more source environments, and receiving, from the user an additional input selecting a given source environment in the additional list, and wherein accessing the source database comprises accessing the source database on the selected source environment.

4. The method according to claim 1, and further comprising presenting, on the display, an additional list of one or more databases, and receiving, from the user an additional input selecting a given database in the additional list, wherein the source database comprises the given database.

5. The method according to claim 1, and further comprising presenting, on the display, an additional list of target environments, and receiving, from the user an additional input selecting the target environment for the target database.

6. The method according to claim 1, and further comprising computing a count of the source records in a given one of the tables, and presenting the count on the display.

7. The method according to claim 1, and further comprising computing, a count of the selected subset of the source records in a given one of the tables, and presenting the count on the display.

8. The method according to claim 1, wherein the filtering request comprises a maximum number of the source records in the one of the tables.

9. The method according to claim 1, wherein the filtering request comprises sampling coverage for the attribute values in the one of the tables.

10. The method according to claim 1, wherein the source records in the selected tables comprise respective sets of attributes that store respective attribute values, and further comprising presenting, on the display, an additional list of attributes of a given selected table in the source database, receiving an additional input selecting a given attribute in the additional list, and wherein generating the target database comprises transforming, in response to receiving the additional input, the attribute values of the given attribute in the selected subset of the source records, and storing the transformed attributes to the target database.

11. The method according to claim 1, wherein the first and the second tables comprise respective identifiers, and further comprising presenting, a widget on the display, receiving, from the user, an additional input selecting the widget, and storing, in response to receiving the additional input, the identifiers and the filtering request to a template.

12. The method according to claim 11, and further comprising, receiving, subsequent to generating the target database, a further input indicating selection of the template, and generating an additional copy of the target database in response to receiving the further input.

13. The method according to claim 1, and further comprising presenting a widget on the display, and wherein generating the target database comprises adding, in response to receiving, from the user, an additional input selecting the widget, one or more of the selected source records to the target database.

14. The method according to claim 1, and further comprising presenting a widget on the display, wherein the target database comprises existing target records, wherein the selected source records and the target records comprise respective sets of attributes that store respective attribute values, and wherein generating the target database comprises replacing, in response to receiving, from the user, an additional input selecting the widget, a given attribute value in a given existing target record with a given attribute value in a given selected source record.

15. The method according to claim 1, and further comprising presenting a widget on the display, wherein the target database comprises existing target records, and wherein generating the target database comprises deleting, in response to receiving, from the user, an additional input selecting the widget, one or more of the target records.

16. The method according to claim 1, and further comprising presenting a widget on the display, wherein the target database comprises existing target records, and wherein generating the target database comprises synchronizing, in response to receiving, from the user, an additional input selecting the widget, the target records to the selected source records.

17. The method according to claim 1, wherein the selected subsets of the source records comprise respective sets of attributes that store respective attribute values, and further comprising presenting a widget on the display, receiving, from the user, an additional input selecting the widget, and presenting, on the display in response to receiving the additional input, the attribute values in a given subset of the source records.

18. The method according to claim 17, and further comprising modifying a given presented attribute value in response to receiving a further input from the user, and presenting, on the display, the modified attribute value.

19. The method according to claim 1, wherein the filtering request comprises a selection of a subset of the attribute values in a given table.

20. The method according to claim 1, and further comprising computing a count of the related tables, and presenting the count on the display.

21. The method according to claim 1, and further comprising computing respective counts of related source records in the related tables, and wherein presenting the second list comprises presenting the respective counts.

22. An apparatus for generating target data for a software application to run in a target environment having a specific capacity, the apparatus comprising:
a display; and
at least one processor configured:
to access a source database comprising source records stored in multiple tables, which are organized in a hierarchy defining respective parent tables and dependent tables of the tables in the source database, containing respective parent source records and dependent source records of the source records in the tables, each source record in the tables comprising one or more attribute values,
to present, on the display, a first list of the tables,
to receive, from a user, a first input selecting a first table in the first list,
to present, on the display, a second list of the tables in the source database that are related to the first table by being parent tables or dependent tables of the first table,
to receive, from the user, a second input selecting at least one second table in the second list,
to present, on the display, filtering criteria for the attribute values in one or more of the tables in a set comprising the first table and the at least one second table,
to receive, from the user, a filtering request for application to the attribute values in one of the tables selected from among the first table and the at least one second table,
to apply the filtering request to the attribute values in the one of the tables so as to select a subset of the source records in the one of the tables,
to compute a size of the subset of the source records together with the parent source records and dependent source records selected from the first table and the at least one second table,
to present, on the display, the computed size together with the specific capacity of the target environment, and
to generate, in the target environment, a target database comprising the selected subset of the source records and the source records in the set of the tables that are the respective parent source records or dependent source records of the source records in the selected subset.

23. A computer software product for generating target data for a software application to run in a target environment having a specific capacity, the product comprising a non-transitory computer-readable medium, in which program instructions are stored, which instructions, when read by a computer, cause the computer:
to access, by a data seeding system, a source database comprising source records stored in multiple tables, which are organized in a hierarchy defining respective parent tables and dependent tables of the tables in the source database, containing respective parent source records and dependent source records of the source records in the tables, each source record in the tables comprising one or more attribute values;
to present, on a display, a first list of the tables;
to receive, from a user, a first input selecting a first table in the first list;
to present, on the display, a second list of the tables in the source database that are related to the first table by being parent tables or dependent tables of the first table;
to receive, from the user, a second input selecting at least one second table in the second list;
to present, on the display, filtering criteria for the attribute values in one or more of the tables in a set comprising the first table and the at least one second table;
to receive, from the user, a filtering request for application to the attribute values in one of the tables selected from among the first table and the at least one second table;
to apply the filtering request to the attribute values in the one of the tables so as to select a subset of the source records in the one of the tables;
to compute a size of the subset of the source records together with the parent source records and dependent source records selected from the first table and the at least one second table;
to present, on the display, the computed size together with the specific capacity of the target environment; and
to generate, in the target environment, a target database comprising the selected subset of the source records and the source records in the set of the tables that are the respective parent source records or dependent source records of the source records in the selected subset.

* * * * *